US012272318B2

(12) United States Patent

Li et al.

(10) Patent No.: US 12,272,318 B2

(45) Date of Patent: Apr. 8, 2025

(54) DATA DRIVING METHOD, SOURCE DRIVER AND DISPLAY APPARATUS

(71) Applicants: Chengdu BOE Optoelectronics Technology Co., Ltd., Sichuan (CN); BOE TECHNOLOGY GROUP CO., LTD., Beijing (CN)

(72) Inventors: Xiangdong Li, Beijing (CN); Hong Zhu, Beijing (CN)

(73) Assignees: Chengdu BOE Optoelectronics Technology Co., Ltd., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/018,914

(22) PCT Filed: Feb. 28, 2022

(86) PCT No.: PCT/CN2022/078193

§ 371 (c)(1),
(2) Date: Jan. 31, 2023

(87) PCT Pub. No.: WO2023/159544

PCT Pub. Date: Aug. 31, 2023

(65) Prior Publication Data

US 2024/0274092 A1 Aug. 15, 2024

(51) Int. Cl.

*G09G 3/30* (2006.01)
*G09G 3/3291* (2016.01)

(52) U.S. Cl.

CPC ..... *G09G 3/3291* (2013.01); *G09G 2310/027* (2013.01); *G09G 2310/08* (2013.01); *G09G 2380/02* (2013.01)

(58) Field of Classification Search

CPC ........... G09G 3/3291; G09G 2310/027; G09G 2310/08; G09G 2380/02

See application file for complete search history.

(56) References Cited

U.S. PATENT DOCUMENTS

2020/0388228 A1* 12/2020 Oh ......................... G09G 5/373

* cited by examiner

*Primary Examiner* — Lisa S Landis

(74) *Attorney, Agent, or Firm* — HOUTTEMAN LAW LLC

(57) ABSTRACT

A data driving method for a source driver in a display apparatus is provided, the display apparatus includes a display panel and the source driver; and the display panel includes: a power trace extending along a first direction, pixel unit groups sequentially arranged away from the input side of the power supply along the first direction, and data lines; the display apparatus includes first and second display states; A and B pixel unit groups are preset for displaying in first and second display states, respectively, A≠B; the method includes: in a first switching process of switching the display apparatus from first to second display states, compensating a data voltage to be loaded to the pixel units in response to a first data compensation start instruction, to compensate a change in a voltage drop on the power trace in the first and second display states different from each other.

18 Claims, 25 Drawing Sheets

S101a: The first data compensation start instruction and a second driving switching instruction are generated in response to a second state switching start instruction

↓

S102: The data voltage to be loaded to the pixel units is compensated in response to the first data compensation start instruction, to compensate the change in the voltage drop on the power trace in two different display states, namely the first display state and the second display state

↓

S103: The compensated data voltage is sequentially output to the preset B pixel unit groups in response to the second driving switching instruction, to drive the preset B pixel unit groups to display

FIG. 10

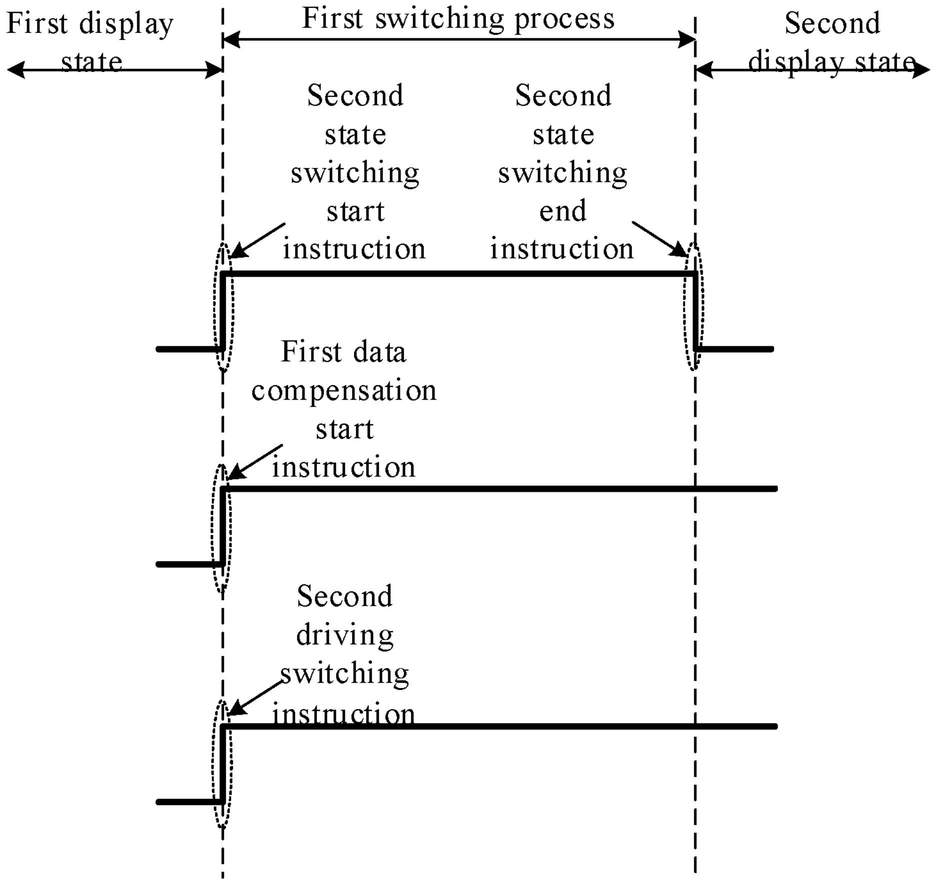

FIG. 11

DATA DRIVING METHOD, SOURCE DRIVER AND DISPLAY APPARATUS

TECHNICAL FIELD

The present disclosure relates to the field of display technology, and in particular to a data driving method, a source driver, and a display apparatus.

BACKGROUND

In recent years, an organic light emitting diode (OLED) display apparatus has become a mainstream product in the display field due to its advantages of high contrast, large viewing angle, fast response, low power consumption, and the like. In addition, the usage forms and scenes of the OLED display apparatus are further improved due to its flexible and bendable properties. At present, terminal devices in various forms, such as a foldable screen, a rollable screen, a scrollable screen, or the like, are successively released, and have more variable display regions and usage forms, so that the terminal devices are vigorously developed by various terminal manufacturers.

SUMMARY

In a first aspect, an embodiment of the present disclosure provides a data driving method for a source driver in a display apparatus, wherein the display apparatus includes a display panel and the source driver; and the display panel includes: a power trace, a plurality of pixel unit groups and a plurality of data lines; the power trace extends away from an input side of a power supply along a first direction; the plurality of pixel unit groups are sequentially arranged away from the input side of the power supply along the first direction; each pixel unit group includes a plurality of pixel units arranged along a second direction; each pixel unit is connected to a corresponding data line and the power trace; the source driver is connected to each data line to write a corresponding data voltage into each data line; the display apparatus includes a first display state and a second display state; A pixel unit groups are preset for displaying in the first display state, B pixel unit groups are preset for displaying in the second display state, A and B are positive integers, and $A \neq B$; and the data driving method includes: in a first switching process of switching the display apparatus from the first display state to the second display state, compensating a data voltage to be loaded to the pixel units in response to a first data compensation start instruction, to compensate a change in a voltage drop on the power trace in the first display state and the second display state different from each other.

In some embodiments, the plurality of pixel unit groups includes N pixel unit groups; the preset A pixel unit groups are an ith pixel unit group to an (i+A−1)th pixel unit group close to the input side of the power supply; the preset B pixel unit groups are the ith pixel unit group to an (i+B−1)th pixel unit group close to the input side of the power supply; and i is a positive integer, $i+A-1 \leq N$, and $i+B-1 \leq N$.

In some embodiments, $i=1$, $A<B$, $B=N$; or $i=1$, $A>B$, $A=N$.

In some embodiments, before the step of compensating a data voltage to be loaded to the pixel units in response to a first data compensation start instruction, the data driving method further includes: generating the first data compensation start instruction and a second driving switching instruction in response to a second state switching start instruction; or generating the first data compensation start instruction and the second driving switching instruction in response to the second state switching start instruction and after a preset first time period; or generating the first data compensation start instruction and the second driving switching instruction in response to a second state switching end instruction; and the data driving method further includes: sequentially outputting the compensated data voltage to the preset B pixel unit groups in response to the second driving switching instruction, to drive the preset B pixel unit groups to display.

In some embodiments, the step of compensating a data voltage to be loaded to the pixel units in response to a first data compensation start instruction includes: compensating the data voltage to be loaded to pixel units according to a preset first compensation voltage to obtain a compensated data voltage Vdata': $Vdata'=Vdata-Vcomp1$; Vdata is a data voltage before the compensation, and Vcomp1 is the preset first compensation voltage; and wherein when $A<B$, $Vcomp1>0$; when $A>B$, $Vcomp1<0$.

In some embodiments, the preset first compensation voltage is related to a maximum voltage drop on the power trace in the first display state and a maximum voltage drop on the power trace in the second display state.

In some embodiments, the preset first compensation voltage Vcomp1 is: $Vcomp1=\alpha 1\times\Delta Vmax\_B-\beta 1\times\Delta Vmax\_A$; $\Delta Vmax\_B$ is the maximum voltage drop on the power trace in the second display state, $\Delta Vmax\_A$ is the maximum voltage drop on the power trace in the first display state, and $\alpha 1$ and $\beta 1$ are preset constants, respectively.

In some embodiments, after the step of sequentially outputting the compensated data voltage to the preset B pixel unit groups in response to the second driving switching instruction, the data driving method further includes: in a second switching process of switching the display apparatus from the second display state to the first display state, stopping compensating the data voltage to be loaded to the pixel units in response to a first data compensation end instruction.

In some embodiments, before the step of stopping compensating the data voltage to be loaded to the pixel units in response to a first data compensation end instruction, the data driving method further includes: generating the first data compensation end instruction and a first driving switching instruction in response to the first state switching start instruction; or generating the first data compensation end instruction and the first driving switching instruction in response to the first state switching start instruction and after a preset second time period; or generating the first data compensation end instruction and the first driving switching instruction in response to a first state switching end instruction; and the data driving method further includes: in response to the first driving switching instruction, sequentially outputting a corresponding data voltage to the preset A pixel unit groups to drive the preset A pixel unit groups to display.

In some embodiments, before the step of compensating the data voltage to be loaded to the pixel units in response to the first data compensation start instruction, the data driving method further includes: generating the first data compensation start instruction in response to a second state switching start instruction; after the step of compensating the data voltage to be loaded to the pixel units in response to the first data compensation start instruction, the data driving method further includes: sequentially outputting the compensated data voltage to the preset A pixel unit groups to drive the preset A pixel unit groups to display; generating a first data compensation end instruction and a second driving switching instruction in response to a second state switching end instruction; stopping compensating the data voltage to be loaded to the pixel units in response to the first data compensation end instruction; and in response to the second driving switching instruction, sequentially outputting the corresponding data voltage to the preset B pixel unit groups to drive the preset B pixel unit groups to display.

In some embodiments, the step of compensating the data voltage to be loaded to the pixel units in response to the first data compensation start instruction includes: compensating the data voltage to be loaded to pixel units according to a preset first compensation voltage and a first compensation coefficient, to obtain a compensated data voltage Vdata': $Vdata' = Vdata + Vcomp1 \times P1(t1)$; Vdata is a data voltage before the compensation, and Vcomp1 is the preset first compensation voltage; P1(t1) is the first compensation coefficient with a value in positive correlation with an elapsed time period t1 of the first switching process, $0 < P1(t1) \leq 1$, $0 < t1S \leq 1$; and T1 is a total time period of the first switching process; and wherein when $A < B$, $Vcomp1 > 0$; when $A > B$, $Vcomp1 < 0$.

In some embodiments, the preset first compensation voltage is related to a maximum voltage drop on the power trace in the first display state and a maximum voltage drop on the power trace in the second display state.

In some embodiments, the preset first compensation voltage Vcomp1 is: $Vcomp1 = \alpha 1 \times \Delta Vmax\_B - \beta 1 \times \Delta Vmax\_A$; where $\Delta Vmax\_B$ is the maximum voltage drop on the power trace in the second display state, $\Delta Vmax\_A$ is the maximum voltage drop on the power trace in the first display state, and $\alpha 1$ and $\beta 1$ are preset constants, respectively.

In some embodiments, the first compensation coefficient P1(t1) is: $P1(t1) = (t1/T1)^{\gamma}$; where $\gamma$ is a gamma value configured for the display apparatus.

In some embodiments, after the step of sequentially outputting the corresponding data voltage to the preset B pixel unit groups in response to the second driving switching instruction, the data driving method further includes: in a second switching process of switching the display apparatus from the second display state to the first display state, compensating the data voltage to be loaded to the pixel units in response to a second data compensation start instruction, to compensate the change in the voltage drop on the power trace in the first display state and the second display state different from each other.

In some embodiments, before the step of compensating the data voltage to be loaded to the pixel units in response to the second data compensation start instruction, the data driving method further includes: generating the second data compensation start instruction in response to a first state switching start instruction; and after the step of compensating the data voltage to be loaded to the pixel units in response to the second data compensation start instruction, the data driving method further includes: sequentially outputting the compensated data voltage to the preset B pixel unit groups to drive the preset B pixel unit groups to display; generating a second data compensation end instruction and a first driving switching instruction in response to a first state switching end instruction; stopping compensating the data voltage to be loaded to the pixel units in response to the second data compensation end instruction; and sequentially outputting a corresponding data voltage to the preset A pixel unit groups in response to the first driving switching instruction, to drive the preset A pixel unit groups to display.

In some embodiments, the step of compensating the data voltage to be loaded to the pixel units in response to the second data compensation start instruction includes: compensating the data voltage to be loaded to pixel units according to a preset second compensation voltage and a second compensation coefficient, to obtain a compensated data voltage Vdata': $Vdata' = Vdata + Vcomp2 \times P2(t2)$; where Vdata is a data voltage before the compensation, and Vcomp2 is the preset first compensation voltage; P2(t2) is the second compensation coefficient with a value in positive correlation with an elapsed time period t2 of the second switching process, $0 < P2(t2) \leq 1$, $0 < t2 \leq T2$; and T2 is a total time period of the second switching process; and wherein when $A < B$, $Vcomp2 < 0$; when $A > B$, $Vcomp2 > 0$.

In some embodiments, the preset second compensation voltage is related to a maximum voltage drop on the power trace in the first display state and a maximum voltage drop on the power trace in the second display state.

In some embodiments, the preset second compensation voltage Vcomp2 is: $Vcomp2 = \alpha 2 \times \Delta Vmax\_A - \beta 2 \times \Delta Vmax\_B$; where $\Delta Vmax\_A$ is the maximum voltage drop on the power trace in the first display state, $\Delta Vmax\_B$ is the maximum voltage drop on the power trace in the second display state, and $\alpha 2$ and $\beta 2$ are preset constants, respectively.

In some embodiments, the second compensation coefficient P2(t2) is: $P2(t2) = (t2/T2)^{\gamma}$; where $\gamma$ is the gamma value configured for the display apparatus.

In some embodiments, the first switching process includes M1 first switching stages occurring in sequence; and in an m1-th first switching stage, the ith pixel unit group to an $(i+A-1+(B-A) \times m1/M1)$th pixel unit group close to the input side of the power supply are displaying, m1 is a positive integer, $m1 \leq M1$, and a value of $(B-A)/M1$ is an integer; before the step of compensating the data voltage to be loaded to the pixel units in response to the first data compensation start instruction, the method further includes: generating the first data compensation start instruction and a second driving continuous switching start instruction in response to a second state switching start instruction; and the step of compensating the data voltage to be loaded to the pixel units in response to the first data compensation start instruction includes: sequentially performing the M1 first switching stages in response to the first data compensation start instruction and the second driving continuous switching start instruction; wherein an m1-th first switching stage includes: compensating a data voltage to be loaded to pixel units in the ith pixel unit group to the $(i+A-1+(B-A) \times m1/M1)$th pixel unit group close to the input side of the power supply, to obtain a compensated data voltage Vdata'; and sequentially outputting the compensated data voltage to the ith pixel unit group to the $(i+A-1+(B-A) \times m1/M1)$th pixel unit group close to the input side of the power supply, to drive the ith pixel unit group to the $(i+A-1+(B-A) \times m1/M1)$th pixel unit group close to the input side of the power supply to display.

In some embodiments, the step of compensating a data voltage to be loaded to pixel units in the ith pixel unit group to the $(i+A-1+(B-A) \times m1/M1)$th pixel unit group close to the input side of the power supply includes: compensating the data voltage to be loaded to pixel units in the ith pixel unit group to the $(i+A-1+(B-A) \times m1/M1)$th pixel unit group close to the input side of the power supply according to a preset third compensation voltage, to obtain a compensated data voltage Vdata': $Vdata' = Vdata - m1 \times Vcomp3$; where Vdata is a data voltage before the compensation, and Vcomp3 is the preset third compensation voltage; and wherein when $A < B$, $Vcomp3 > 0$; when $A > B$, $Vcomp3 < 0$.

In some embodiments, the preset third compensation voltage Vcomp3 is: $Vcomp3=\delta1\times Vchange\times(B-A)/M1$; where δ1 is a preset compensation coefficient, and Vchange is an increase value of a maximum voltage drop of the power trace for each additional pixel unit group for displaying in the display apparatus.

In some embodiments, after the step of sequentially performing M1 first switching stages in response to the first data compensation start instruction and the second driving continuous switching start instruction, the data driving method further includes: in a second switching process of switching the display apparatus from the second display state to the first display state, in response to a second data compensation start instruction, compensating the data voltage to be loaded to the pixel units, to compensate the change in the voltage drop on the power trace in the first display state and the second display state different from each other.

In some embodiments, the second switching process includes M2 second switching stages occurring in sequence; in an m2-th second switching stage, an ith pixel unit group to an $(i+B-1-(B-A)\times m2/M2)$th pixel unit group close to the input side of the power supply are displaying, wherein m2 is a positive integer, $m2\leq M2$, and a value of $(B-A)/M2$ is an integer; before the step of compensating the data voltage to be loaded to the pixel units in response to a second data compensation start instruction, the method further includes: generating the second data compensation start instruction and a first driving continuous switching instruction in response to the first state switching start instruction; and the step of compensating the data voltage to be loaded to the pixel units in response to a second data compensation start instruction includes: sequentially performing M2 second switching stages in response to the second data compensation start instruction and the first driving continuous switching instruction; wherein an m2-th second switching stage includes: compensating the data voltage to be loaded to pixel units in the ith pixel unit group to the $(i+B-1-(B-A)\times m2/M2)$th pixel unit group close to the input side of the power supply, to obtain a compensated data voltage Vdata'; and sequentially outputting the compensated data voltage to the ith pixel unit group to the $(i+B-1-(B-A)\times m2/M2)$th pixel unit group close to the input side of the power supply, to drive the ith pixel unit group to the $(i+B-1-(B-A)\times m2/M2)$th pixel unit group close to the input side of the power supply to display.

In some embodiments, the step of compensating the data voltage to be loaded to pixel units in the ith pixel unit group to the $(i+B-1-(B-A)\times m2/M2)$th pixel unit group close to the input side of the power supply includes: compensating the data voltage to be loaded to pixel units in the ith pixel unit group to the $(i+B-1-(B-A)\times m2/M2)$th pixel unit group close to the input side of the power supply according to a preset fourth compensation voltage, to obtain a compensated data voltage Vdata': $Vdata'=Vdata-(M2-m2)\times Vcomp4$; where Vdata is a data voltage before the compensation, and Vcomp4 is the preset fourth compensation voltage; and wherein when $A<B$, $Vcomp4>0$; when $A>B$, $Vcomp4<0$.

In some embodiments, the preset fourth compensation voltage Vcomp4 is: $Vcomp4=\delta2\times Vchange\times(B-A)/M1$; where δ2 is a preset compensation coefficient, and Vchange is an increase in the maximum voltage drop of the power trace each time when an additional pixel unit group is added in the display apparatus for displaying.

In some embodiments, after the step of compensating the data voltage to be loaded to the pixel units in response to the second data compensation start instruction, the data driving method further includes: generating a second data compensation end instruction in response to a first state switching end instruction; and stopping compensating the data voltage to be loaded to the pixel units in response to the second data compensation end instruction.

In some embodiments, between the first switching process and the second switching process, the data driving method further includes: when the display apparatus is in the second display state, compensating the data voltage to be loaded to the preset B pixel unit groups in the same data voltage compensation way as that in the M1-th first switching stage; and sequentially outputting the compensated data voltage to the preset B pixel unit groups to drive the preset B pixel unit groups to display.

In a second aspect, an embodiment of the present disclosure further provides a source driver, including: one or more processors; a memory having one or more programs stored thereon; the one or more programs, when executed by the one or more processors, cause the one or more processors to implement the data driving method in the first aspect.

In a third aspect, an embodiment of the present disclosure further provides a display apparatus, including: a display panel and the source driver in the first aspect.

In some embodiments, the display panel is a flexible display panel.

In some embodiments, the flexible display panel is a foldable screen, a rollable screen, or a scrollable screen.

BRIEF DESCRIPTION OF DRAWINGS

FIG. 10 is another flowchart of a data driving method according to an embodiment of the present disclosure;

FIG. 11 is a timing diagram corresponding to the data driving method shown in FIG. 10;

DETAIL DESCRIPTION OF EMBODIMENTS

The technical solutions in the embodiments of the present disclosure will be described clearly and completely with reference to the drawings in the embodiments of the present disclosure. It is obvious that the embodiments described are only some embodiments of the present disclosure, rather than all embodiments. All other embodiments, which can be derived by one of ordinary skill in the art from the embodiments of the present disclosure without any creative effort, shall fall within a protection scope of the present disclosure.

In the embodiments of the present disclosure, the wording "first", "second", or the like is used for distinguishing the same or similar items having substantially the same function and action from each other, only for clearly describing technical solutions of the embodiments of the present disclosure, but cannot be understood as indicating or implying relative importance or implicitly indicating the number of indicated technical features.

Figure 1:
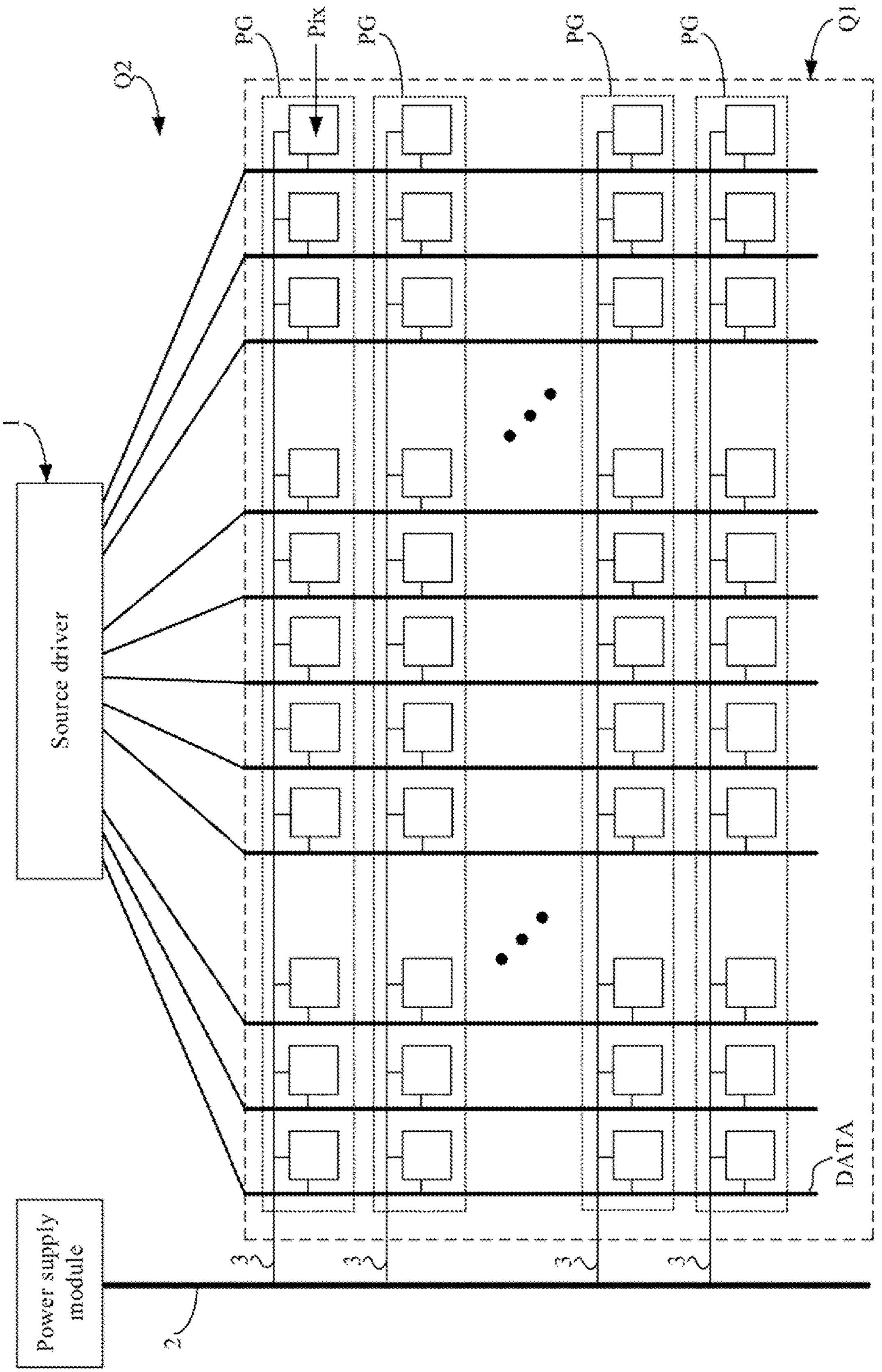
FIG. 1 is a schematic diagram of a structure of a display apparatus according to the present disclosure.

FIG. 1 is a schematic diagram of a structure of a display apparatus according to the present disclosure. As shown in FIG. 1, the display apparatus includes a display panel and a source driver 1; the display panel includes a display region Q1 and a peripheral region Q2; the source driver 2 is located in the peripheral region Q2; a power trace 2 is further disposed in the peripheral region Q2 and extends away from an input side of a power supply along a first direction; a plurality of pixel unit groups PG are disposed in the display region Q1 and sequentially arranged away from the input side of the power supply along the first direction; each pixel unit group PG includes a plurality of pixel units Pix arranged along a second direction (the second direction intersects with the first direction, for example, the second direction may be perpendicular to the first direction); each pixel unit Pix is connected to a corresponding data line DATA and the power trace 2; the source driver 1 is connected to each data line DATA to write a corresponding data voltage into each data line DATA; and the power trace 2 is configured to write a power voltage VDD input from the input side of the power supply (provided with a power supply module connected to the power trace) into each pixel unit Pix.

Exemplarily, the first direction is a column direction and the second direction is a row direction, as shown in FIG. 1, which is only exemplary and does not limit the technical solution of the present disclosure.

Figure 2:
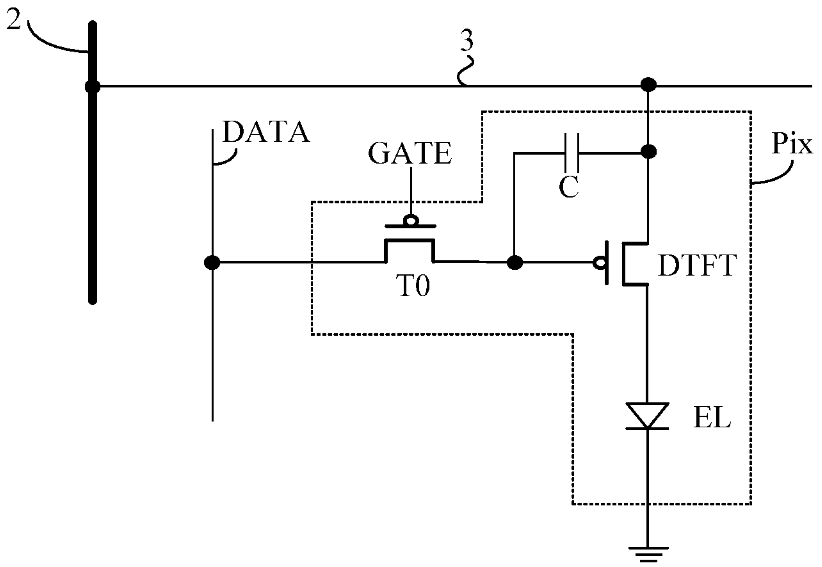
FIG. 2 is a schematic diagram of a circuit structure of a pixel unit according to an embodiment of the present disclosure.
Figure 3:
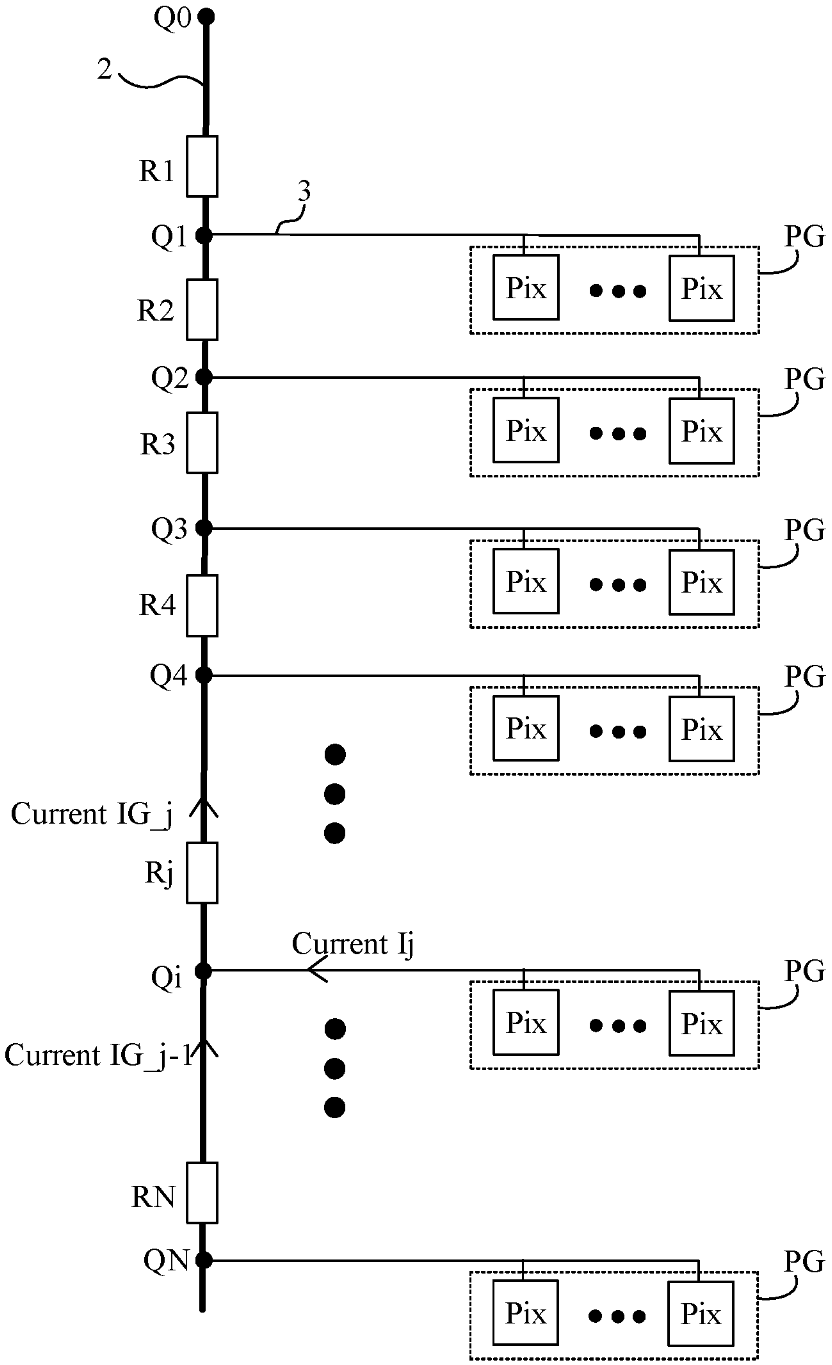
FIG. 3 is a schematic diagram illustrating a connection between pixel units in different pixel unit groups and a power trace according to an embodiment of the present disclosure.

FIG. 2 is a schematic diagram of a circuit structure of a pixel unit according to an embodiment of the present disclosure; FIG. 3 is a schematic diagram illustrating a connection between pixel units in different pixel unit groups and a power trace according to an embodiment of the present disclosure. As shown in FIG. 2 and FIG. 3, in some embodiments, a pixel unit includes a pixel driving circuit and a light emitting device EL; and the pixel driving circuit is configured to generate a corresponding driving current according to a received data voltage and output the driving current to the light emitting device EL to drive the light emitting device EL to emit light.

The light emitting device EL in the embodiment of the present disclosure may be a current-driven type light emitting device, such as an OLED, a light emitting diode, or the like.

In some embodiments, the pixel driving circuit adopts a 2T1C structure. That is, the pixel driving circuit includes two transistors (including one switching transistor T0 and one driving transistor DTFT, a gate electrode of the switching transistor T0 is connected to a gate line GATE) and one capacitor C. Optionally, the transistors in the pixel driving circuit are all P-type transistors. Alternatively, each transistor in the pixel driving circuit may be selected from an N-type transistor or a P-type transistor, respectively. It should be noted that the pixel driving circuit shown in FIG. 2 adopts the 2T1C structure, which is only exemplary and does not limit the technical solution of the present disclosure. In the embodiment of the present disclosure, alternatively, the pixel driving circuit may adopt a structure having other number of transistors, such as a 7T2C structure, a 6T1C structure, a 6T2C structure, or a 9T2C structure, which is not limited in the embodiment of the present disclosure.

In some embodiments, in order to connect the pixel units Pix to the power trace, each pixel unit group PG is configured with a corresponding connection trace 3 extending along the second direction, and the pixel units Pix in the same pixel unit group PG are connected to the power trace 2 through the corresponding same connection trace 3. The connection traces 3 configured for different pixel unit groups PG are connected to different positions on the power trace 2.

For convenience of description, one end of the power trace 2 close to the input side of the power supply is denoted as a node Q0, and a voltage at the node Q0 is denoted as VDD; a node where a connection trace configured for a jth pixel unit group PG close to the input side of the power supply is connected to the power trace is denoted as Qj, a voltage at the node Qj is denoted as Vj, a resistor between the node Qj and a node Qj−1 is Rj, 1≤j≤N; wherein N is the total number of the pixel unit groups PG in the display panel. Because there is a voltage Drop (IR Drop) on the power trace, the different power voltages are actually loaded on different positions on the power trace when the N pixel unit groups PG are all displaying.

By taking the node Qj as an example, a current flowing through the resistor Rj is IG_j, a current flowing through the connection trace configured for the jth pixel unit group PG is Ij, and a current flowing through a resistor Rj−1 is IG_j−1; wherein IG_j=Ij+IG_j−1. Similarly, IG_j−1=Ij−1+IG_j−2;

$$\text{IG\_j} = \sum_{k=i}^{k=N} Ik$$

may be obtained by iteration.

At this time, a voltage difference across the resistor Rj is ΔV_Rj=IG_j×Rj, i.e., Vj+1−Vj=IG_j×Rj. The voltage at the node Qj is $$Vj = VDD - \sum_{k=1}^{k=j} \Delta\text{V\_Rk}.$$

Based on the above, it can be seen that the actually loaded power voltages at different nodes on the power trace are different from each other. That is, the power voltages transmitted on different connection traces are different from each other, and the power voltages received by different pixel unit groups PG are different from each other. More specifically, VDD>V1>V2>V3 . . . >VN.

In each pixel unit located in the jth pixel unit group PG, a driving current Iout output by the driving transistor is:

$$Iout = K \times (Vgs - Vth)^2 = K \times (Vdata - Vj - Vth)^2$$

where K is a constant, which is related to channel characteristics of the driving transistor, Vgs is a gate-source voltage of the driving transistor, and Vgs=Vdata−Vj<0. For convenience of description, Vth=0V is assumed. At this time, Iout=K×(Vdata−VDD)$^2$.

If Vdata is not changed and the power voltage Vj actually applied to the pixel units in the jth pixel unit group PG decreases, Iout decreases. That is, a light emitting luminance of the light emitting devices in the pixel units in the jth pixel unit group PG decreases. If Vdata is not changed and the power voltage Vj actually applied to the pixel units in the jth pixel unit group PG increases, Iout increases. That is, the light emitting luminance of the light emitting devices in the pixel units in the jth pixel unit group PG increases.

Based on the above, it can be seen that when the power voltages received by the two pixel units are different from each other, for the same data voltage Vdata, the driving currents generated in the two pixel units are different from each other, and the light emitting luminances of the light emitting devices in the two pixel units are different. That is, the display effect of the pixel units in different pixel unit groups PG is not uniform. In order to solve this problem, manufacturers may consider a voltage drop on the power trace, and add a compensation for the voltage drop during manufacturing the display apparatus (the specific compensation method belongs to the common knowledge in the field, which is not described herein), so that when N pixel unit groups PG on the display panel are all displaying, the display effect of the pixel units in different pixel unit groups PG can be approximately uniform.

However, with the development of the technology, the display apparatus is necessarily applied to more application scenarios, such as scenarios where the number of pixel unit groups for displaying in the display apparatus varies. Specifically, the display apparatus includes a first display state and a second display state. A pixel unit groups are preset for displaying in the first display state, B pixel unit groups are preset for displaying in the second display state, A and B are positive integers, and A≠B. The number of pixel unit groups for displaying varies, so that the voltage drop of each node on the power trace changes (namely, there is a change in the voltage drop on the power trace), and the power voltage actually received by the same pixel unit group may also change.

Figure 4:
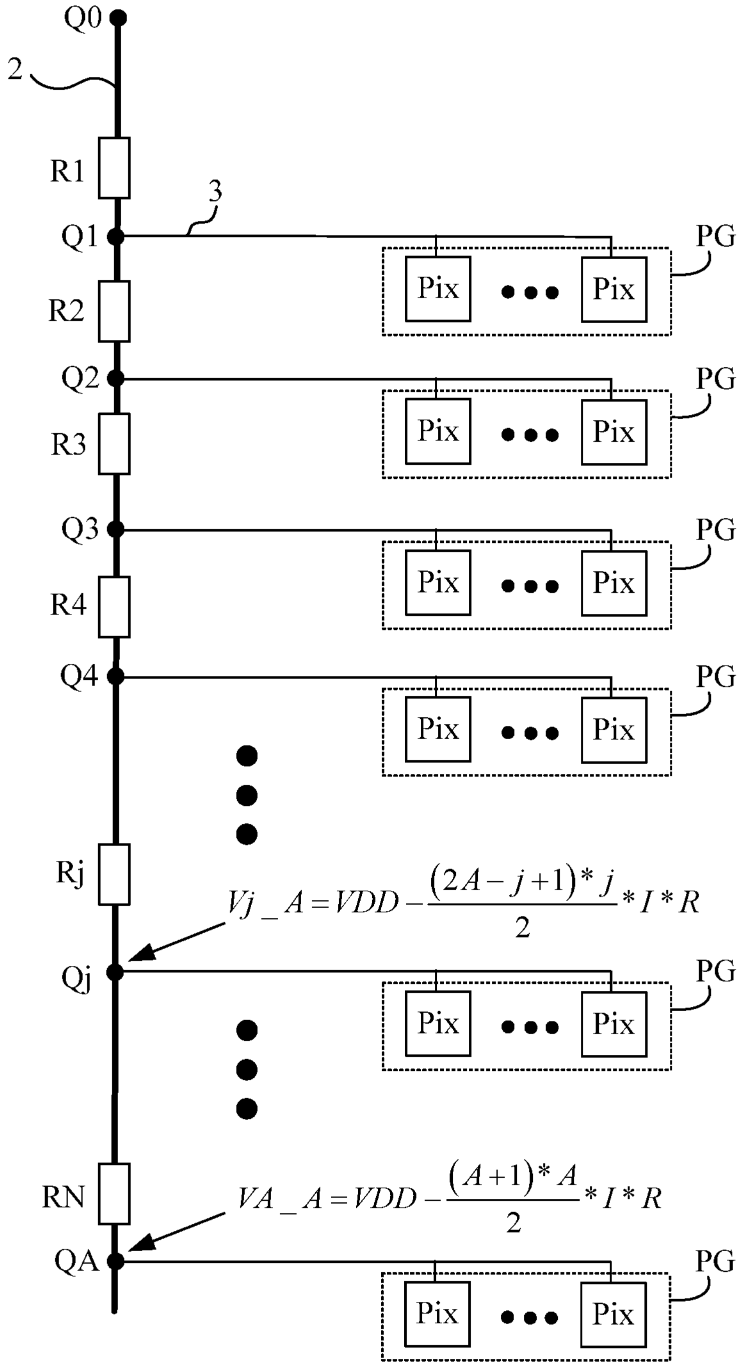
FIG. 4 is a schematic diagram showing voltages applied to different positions on a power trace when A pixel unit groups are displaying.
Figure 5:
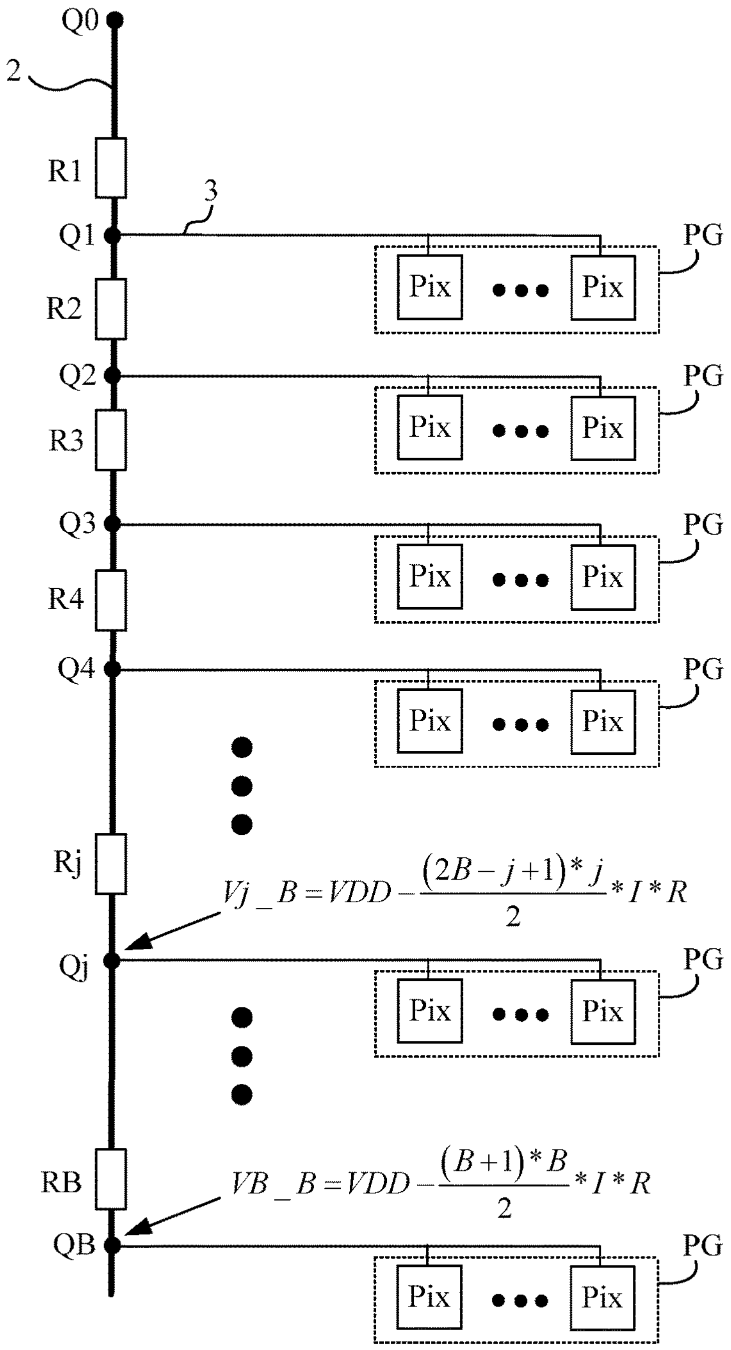
FIG. 5 is a schematic diagram showing voltages applied to different positions on a power trace when B pixel unit groups are displaying.

FIG. 4 is a schematic diagram showing voltages applied to different positions on a power trace when A pixel unit groups are displaying; FIG. 5 is a schematic diagram showing voltages applied to different positions on a power trace when B pixel unit groups are displaying. As shown in FIG. 4 and FIG. 5, assuming that current on a connection trace 3 configured for each pixel unit group PG is I when displaying (there is no current on the connection trace 3 configured for the pixel unit group PG when not displaying, or the current may be regarded as 0), a resistance between connection points of the connection traces 3 configured for any two adjacent pixel units and the power trace 2 is R.

When A pixel unit groups PG are displaying, the following can be derived through calculation: a voltage difference across a resistor RA is ΔV_RA=I×R, a voltage difference across a resistor RA−1 is ΔV_RA−1=2×I×R, a voltage difference across a resistor RA−2 is ΔV_RA−2−3×I×R, . . . , the voltage difference across the resistor Rj is ΔV_Rj=(A−j+1)×I×R, a voltage difference across a resistor R2 is ΔV_R2=(A−1)×I×R, a voltage difference across a resistor R1 is ΔV_R1=A×I×R.

When A pixel unit groups PG are displaying, a maximum voltage drop VDD−VA_A on the power trace 2 is $$\frac{A*(A+1)}{2}*I*R,$$

and the voltage Vj_A at the node Qj is:

$$\text{Vj\_A} = VDD - \sum_{k=1}^{k=j} \Delta\text{V\_Rk} = VDD - \frac{(2A-j+1)*j}{2}*I*R.$$

Similarly, when B pixel unit groups PG are displaying, the following can be derived through calculation: a voltage difference across a resistor RB is $\Delta V\_RB=I\times R$, a voltage difference across a resistor RB−1 is $\Delta V\_RB-1=2\times I\times R$, a voltage difference across a resistor RB−2 is $\Delta V\_RB-2=3\times I\times R$, . . . , the voltage difference across the resistor Rj is $\Delta V\_Rj=(B-j+1)\times I\times R$, . . . , a voltage difference across a resistor R2 is $\Delta V\_R2=(B-1)\times I\times R$, a voltage difference across a resistor R1 is $\Delta V\_R1=B\times I\times R$.

When B pixel unit groups PG are displaying, a maximum voltage drop VDD-VB_b on the power trace 2 is $$\frac{B*(B+1)}{2}*I*R,$$

and the voltage Vj_B at the node Qj is:

$$\text{Vj\_B} = VDD - \sum_{k=1}^{k=j}\Delta\text{V\_Rk} = VDD - \frac{(2B-j+1)*j}{2}*I*R.$$

Since A≠B, Vj_A≠Vj_B; that is, the voltage at the node Qj when the A pixel unit groups PG are displaying is not equal to the voltage at the node Qj when the B pixel unit groups PG are displaying.

Based on the above, when the number of pixel unit groups for displaying in the display apparatus varies, the power voltage actually loaded on the same node on the power trace also changes; accordingly, the power voltage supplied to the same pixel unit group also changes, and the light emitting luminance of the pixel unit group jumps.

Specifically, when the display apparatus switches from a state where A pixel unit groups are displaying to a state where B pixel unit groups are displaying; if A<B, Vj_A>Vj_B. That is, the power voltage supplied to the jth pixel unit group is decreased, and the light emitting luminance of the pixel unit group corresponding to the connection trace connected to the node Qj is decreased under a condition that a data voltage received by the pixel unit group corresponding to the connection trace connected to the node Qj is not changed. If A>B, Vj_A<Vj_B. That is, the power voltage supplied to the jth pixel unit group is increased, and the light emitting luminance of the pixel unit group corresponding to the connection trace connected to the node Qj is increased under the condition that the data voltage received by the pixel unit group corresponding to the connection trace connected to the node Qj is not changed.

Therefore, when the number of pixel unit groups for displaying in the display apparatus varies, the user may observe an abrupt change in the light emitting luminance of the display apparatus, which affects the user experience.

In view of the above technical problems, embodiments of the present disclosure provide corresponding solutions, which will be described in detail below with reference to specific embodiments.

Figure 6:
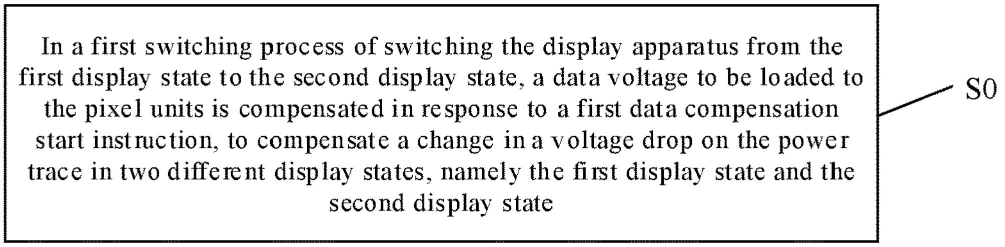
FIG. 6 is a flowchart of a data driving method according to an embodiment of the present disclosure.

FIG. 6 is a flowchart of a data driving method according to an embodiment of the present disclosure. As shown in FIG. 6, the data driving method is applied to a source driver in a display apparatus. The display apparatus includes a display panel and the source driver, and the display panel includes: a power trace, a plurality of pixel unit groups and a plurality of data lines; the power trace extends away from an input side of a power supply along a first direction; the plurality of pixel unit groups are sequentially arranged away from the input side of the power supply along the first direction; each pixel unit group includes a plurality of pixel units arranged along a second direction; each pixel unit is connected to a corresponding data line and the power trace; the source driver is connected to each data line to write a corresponding data voltage into each data line. The display apparatus includes a first display state and a second display state. A pixel unit groups are preset for displaying in the first display state, B pixel unit groups are preset for displaying in the second display state, A and B are positive integers, and A≠B. The data driving method includes:

Step S0, in a first switching process of switching the display apparatus from the first display state to the second display state, a data voltage to be loaded to the pixel units is compensated in response to a first data compensation start instruction, to compensate a change in a voltage drop on the power trace in two different display states, namely the first display state and the second display state.

In the embodiment of the present disclosure, in the first switching process of switching the display apparatus from the first display state to the second display state, the data voltage to be loaded to the pixel units is compensated to compensate the change in the voltage drop on the power trace in the two different display states, so that the problem of the abrupt change in the light emitting luminance of the display apparatus caused by the change in the voltage drop on the power trace can be effectively solved.

In some embodiments, the number of pixel unit groups is N; the preset A pixel unit groups are ith to (i+A−1)th pixel unit groups close to the input side of the power supply; the preset B pixel unit groups are ith to (i+B−1) th pixel unit groups close to the input side of the power supply; i is a positive integer, i+A−1≤N, i+B−1≤N.

Figure 7:
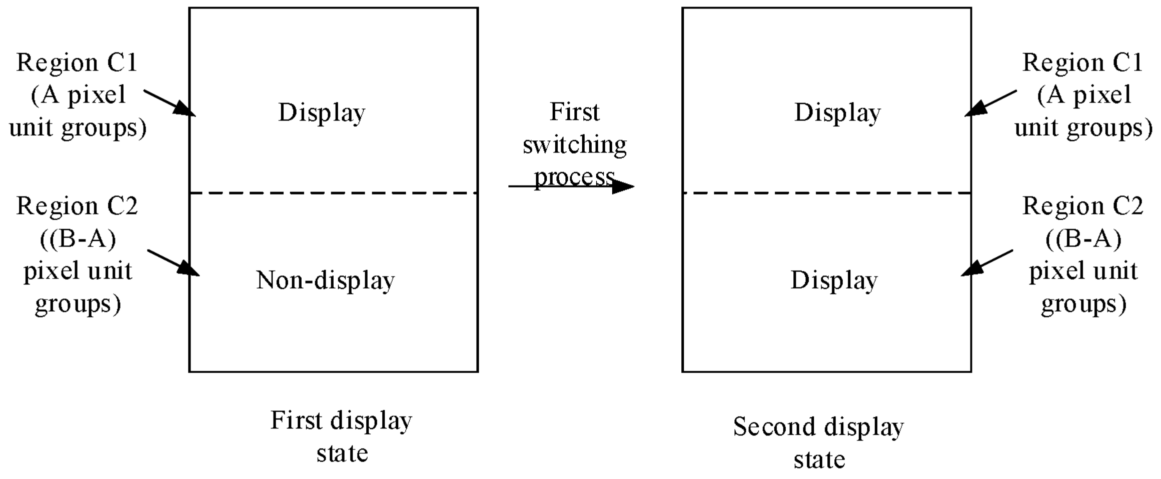
FIG. 7 is a schematic diagram illustrating switching of a display apparatus from a first display state to a second display state according to an embodiment of the present disclosure.

FIG. 7 is a schematic diagram illustrating switching of a display apparatus from a first display state to a second display state according to an embodiment of the present disclosure. As shown in FIG. 7, in some embodiments, i=1, A<B, and B=N. Specifically, the display apparatus includes B pixel unit groups arranged in the first direction, and the display apparatus is divided into two regions arranged in the first direction: a region C1 and a region C2. The region C1 is closer to the input side of the power supply, and includes A pixel unit groups, i.e., 1st to Ath pixel unit groups; the region C2 includes (B−A) pixel unit groups, i.e., (A+1)th to Bth pixel unit groups. The preset A pixel unit groups are all pixel unit groups in the region C1, and the preset B pixel unit groups are all pixel unit groups in the region C1 and the region C2.

Figure 8:
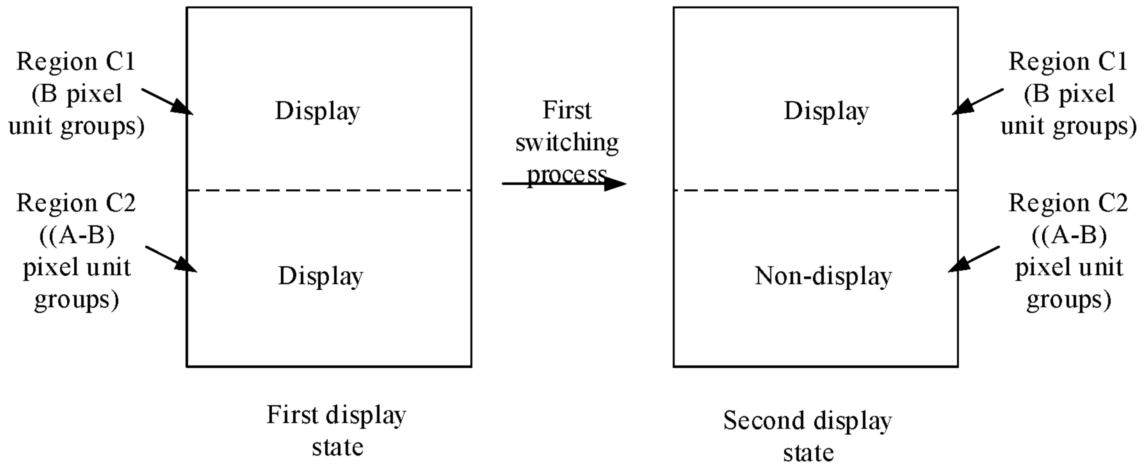
FIG. 8 is a schematic diagram illustrating switching of a display apparatus from a first display state to a second display state according to an embodiment of the present disclosure.

FIG. 8 is a schematic diagram illustrating switching of a display apparatus from a first display state to a second display state according to an embodiment of the present disclosure. As shown in FIG. 8, in some embodiments, i=1, A>B, and A=N. Specifically, the display apparatus includes A pixel unit groups arranged in the first direction, and the display apparatus is divided into two regions arranged in the first direction: a region C1 and a region C2. The region C1 is closer to the input side of the power supply, and includes B pixel unit groups, i.e., 1st to Bth pixel unit groups; the region C2 includes (A−B) pixel unit groups, i.e., (B+1)th to Ath pixel unit groups. The preset A pixel unit groups are all pixel unit groups in the region C1 and the region C2, and the preset B pixel unit groups are all pixel unit groups in the region C1.

In some embodiments, the display panel is a flexible display panel. Further, optionally, the flexible display panel is a foldable screen, a rollable screen, or a scrollable screen.

Figure 9A:
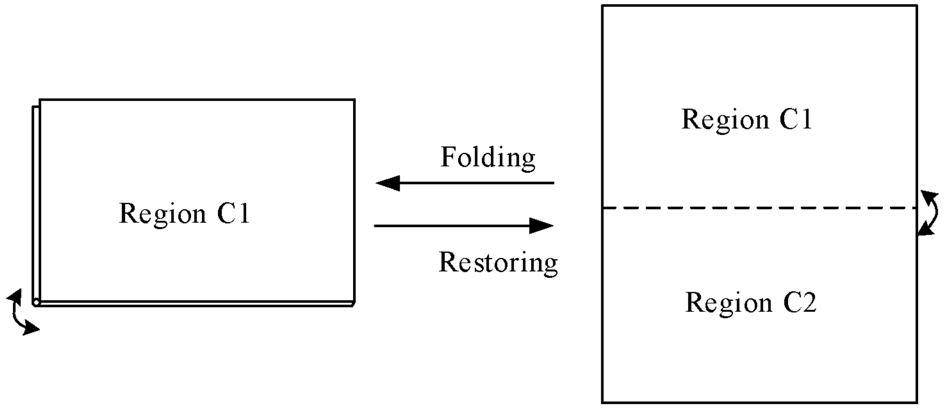
FIG. 9A is a schematic diagram illustrating switching of a foldable screen between a state where the foldable screen is displaying by only using a region C1 and a state where the foldable screen is displaying by using both of the region C1 and a region C2 according to the embodiment of the present disclosure.
Figure 9B:
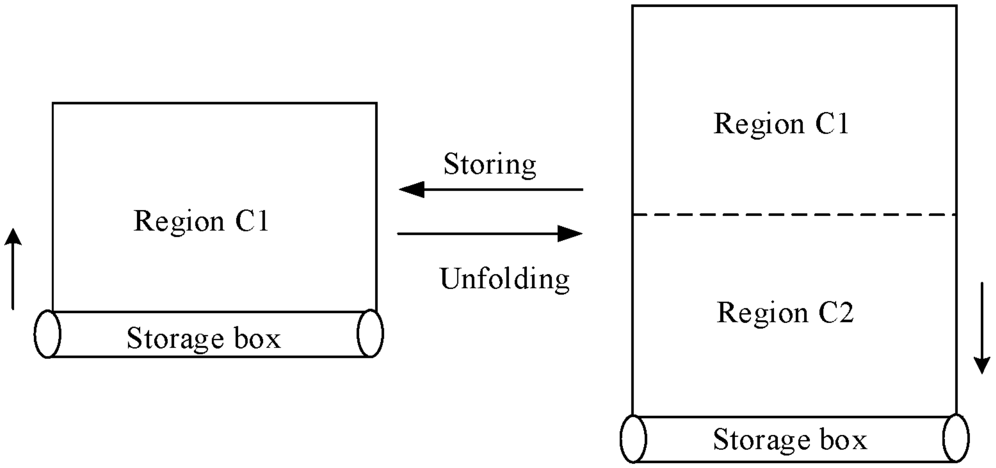
FIG. 9B is a schematic diagram illustrating switching of a rollable screen between a state where the rollable screen is displaying by only using a region C1 and a state where the rollable screen is displaying by using both of the region C1 and a region C2 according to the embodiment of the present disclosure.
Figure 9C:
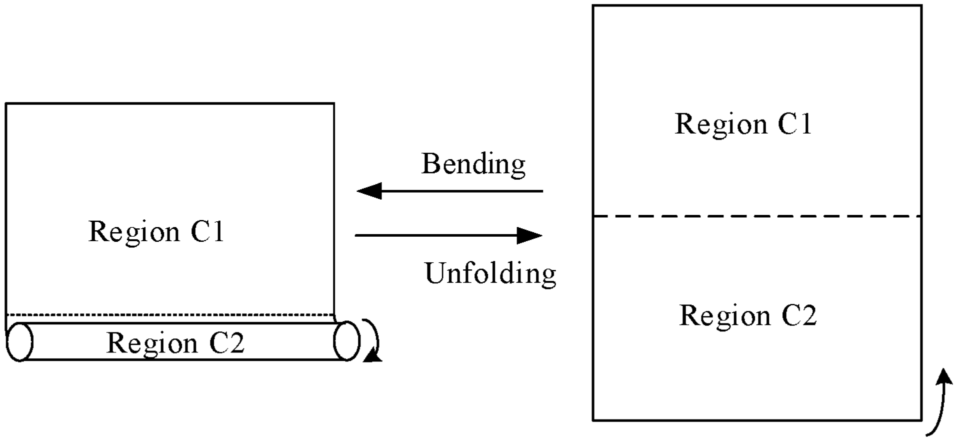
FIG. 9C is a schematic diagram illustrating switching of a scrollable screen between a state where the scrollable screen is displaying by only using a region C1 and a state where the scrollable screen is displaying by using both of the region C1 and a region C2 according to the embodiment of the present disclosure.

FIG. 9A is a schematic diagram illustrating switching of a foldable screen between a state where the foldable screen is displaying by only using a region C1 and a state where the foldable screen is displaying by using both of the region C1 and a region C2 according to the embodiment of the present disclosure; FIG. 9B is a schematic diagram illustrating switching of a rollable screen between a state where the rollable screen is displaying by only using a region C1 and a state where the rollable screen is displaying by using both of the region C1 and a region C2 according to the embodiment of the present disclosure; FIG. 9C is a schematic diagram illustrating switching of a scrollable screen between a state where the scrollable screen is displaying by only using a region C1 and a state where the scrollable screen is displaying by using both of the region C1 and a region C2 according to the embodiment of the present disclosure. As shown in FIGS. 9A to 9C, when each of the foldable screen, the rollable screen, and the scrollable screen is switched between the display states, and the display panel is also switched between physical states synchronously. For example, for the foldable screen, the region C2 may be partially folded onto the back of the region C1 in a folding way, or the region C2 may be partially restored to be in a same plane as the region C1; for the rollable screen, the region C2 may be partially stored in a storage box in a sliding way, or the region C2 may be partially slid out of the storage box and unfolded in a sliding way; for the scrollable screen, the region C2 may be stored by partially bending the region C2, or the region C2 in a bent state may be unfolded.

As some specific scenarios, when i=1, A<B, B=N, in the switching process of switching the display apparatus from the first display state to the second display state, it is realized in the foldable screen that the region C2 located on the back of the region C1 is partially restored to be on the same plane as the region C1; it is realized in the rollable screen that the region C2 located in the storage box is partially slid out and unfolded to be on the same plane as the region C1; and it is realized in the scrollable screen that the region C2 in the bending state is partially unfolded to be on the same plane as the region C1. Accordingly, in a switching process of switching the display apparatus from the second display state to the first display state, it is realized in the foldable screen that the region C2 is partially folded onto the back of the region C1; it is realized in the rollable screen that the region C2 is partially slidingly stored in the storage box; and it is realized in the scrollable screen that the region C2 is partially bent.

As other specific scenarios, when i=1, A>B, and A=N, in the switching process of switching the display apparatus from the first display state to the second display state, it is realized in the foldable screen that the region C2 is partially folded onto the back of the region C1; it is realized in the rollable screen that the region C2 is partially slidingly stored in the storage box; and it is realized in the scrollable screen that the region C2 is partially bent. Accordingly, in the switching process of switching the display apparatus from the second display state to the first display state, it is realized in the foldable screen that the region C2 located on the back of the region C1 is partially folded to be on the same plane as the region C1; it is realized in the rollable screen that the region C2 located in the storage box is partially slid out to be on the same plane as the region C1; and it is realized in the scrollable screen that the region C2 in the bending state is partially unfolded to be on the same plane as the region C1.

Alternatively, the technical solution of the present disclosure may also be applied to other scenarios, which are not described here by way of example.

FIG. 10 is another flowchart of a data driving method according to an embodiment of the present disclosure; FIG. 11 is a timing diagram for the data driving method shown in FIG. 10. As shown in FIG. 10 and FIG. 11, the data driving method includes:

Step S101*a*, the first data compensation start instruction and a second driving switching instruction are generated in response to a second state switching start instruction.

The switching between the display states of the display apparatus may be accompanied by the switching between the physical states of the display apparatus (e.g., folding/restoring of the foldable screen, storing/unfolding of the rollable screen, and bending/unfolding of the scrollable screen), and thus there may be a switching process for the switching between the display states. In the embodiments of the present disclosure, a switching process of switching the display apparatus from the first display state to the second display state is referred to as a first switching process, and a switching process of switching the display apparatus from the second display state to the first display state is referred to as a second switching process. In the first switching process and the second switching process, the display apparatus is also switched between the physical states correspondingly.

Specifically, in response to a preset first operation instruction (a pre-designed operation instruction corresponding to the first switching process), a switching control unit in the display apparatus generates a second state switching start instruction, which indicates that the first switching process is started. Accordingly, the display apparatus is also switched between the physical states (for example, the folding operation for the foldable screen, the restoring operation for the foldable screen, the sliding and storing operation for the rollable screen, the sliding and unfolding operation for the rollable screen, the bending operation for the scrollable screen, or the unfolding operation for the scrollable screen, and the specific switching operation corresponds to the preset first operation instruction). The source driver generates the first data compensation start instruction and the second driving switching instruction in response to the second state switching start instruction.

Step S102, the data voltage to be loaded to the pixel units is compensated in response to the first data compensation start instruction, to compensate the change in the voltage drop on the power trace in two different display states, namely the first display state and the second display state.

Step S103, the compensated data voltage is sequentially output to the preset B pixel unit groups in response to the second driving switching instruction, to drive the preset B pixel unit groups to display.

That is, at the beginning of the first switching process, the source driver starts to compensate the data voltage to compensate the change in the voltage drop on the power trace in two different display states, namely the first display state and the second display state; meanwhile, the source driver also provides the data voltage for the preset A pixel unit groups to drive the preset A pixel unit groups to display, and switches to sequentially output the compensated data voltage to the preset B pixel unit groups to drive the preset B pixel unit groups to display. That is, both the starting of the compensation for the data voltage and the switching of the number of the pixel unit groups for displaying are performed at the beginning of the first switching process.

Figure 12:
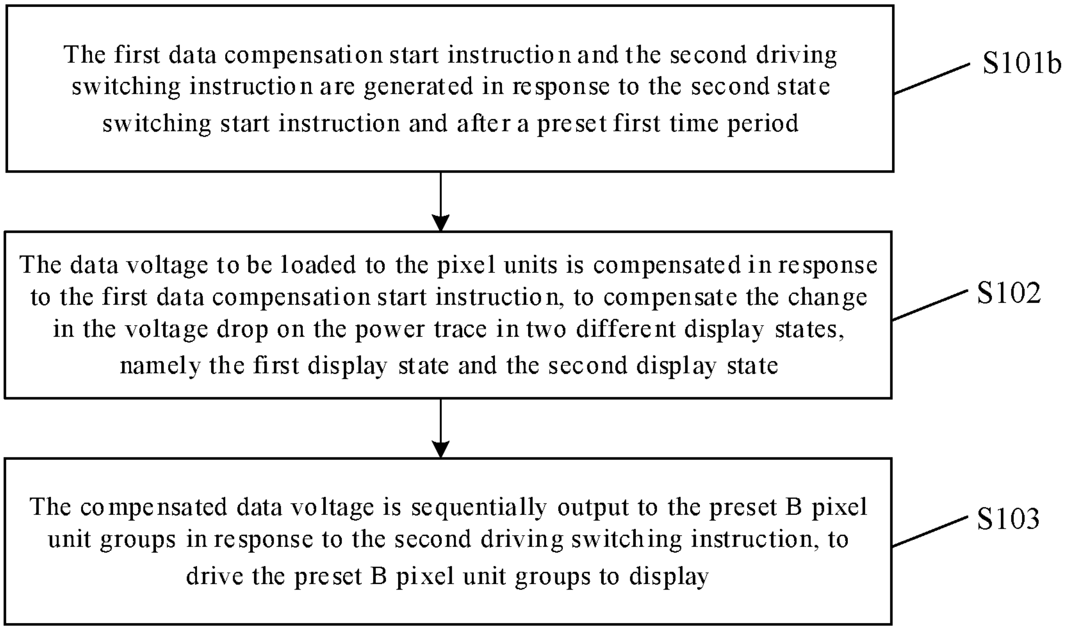
FIG. 12 is another flowchart of a data driving method according to an embodiment of the present disclosure.
Figure 13:
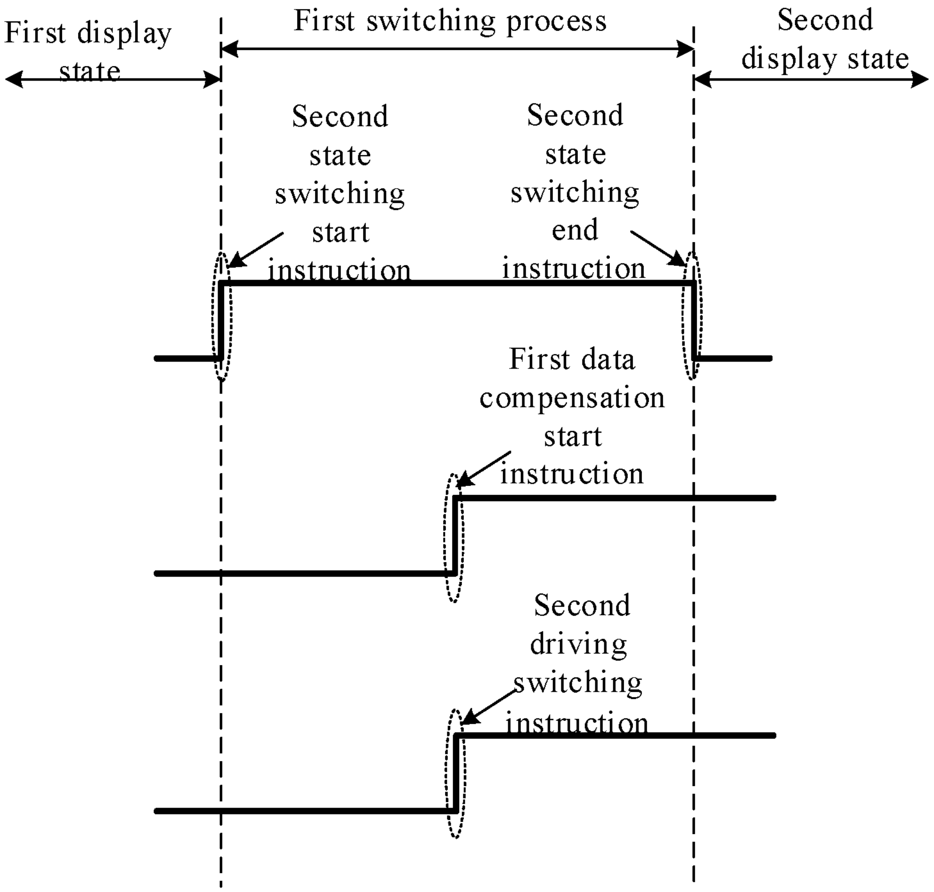
FIG. 13 is a timing diagram corresponding to the data driving method shown in FIG. 12.

FIG. 12 is another flowchart of a data driving method according to an embodiment of the present disclosure; FIG. 13 is a timing diagram corresponding to the data driving method shown in FIG. 12. As shown in FIG. 12 and FIG. 13, in the data driving method shown in FIG. 12, the step S101*a* in the data driving method shown in FIG. 10 is replaced by step S101*b*, which will be described in detail below.

Step S101*b*, the first data compensation start instruction and the second driving switching instruction are generated in response to the second state switching start instruction and after a preset first time period.

Unlike the embodiment shown in FIG. 10 where the source driver generates the first data compensation start instruction and the second driving switching instruction at the beginning of the first switching process, in the embodiment shown in FIG. 12, the source driver generates the first data compensation start instruction and the second driving switching instruction at the beginning of the first switching process and after the preset first time period (its specific value may be preset according to actual needs). That is, both the starting of the compensation for the data voltage and the switching of the number of the pixel unit groups for displaying are performed at the beginning of the first switching process and after the preset first time period.

Figure 14:
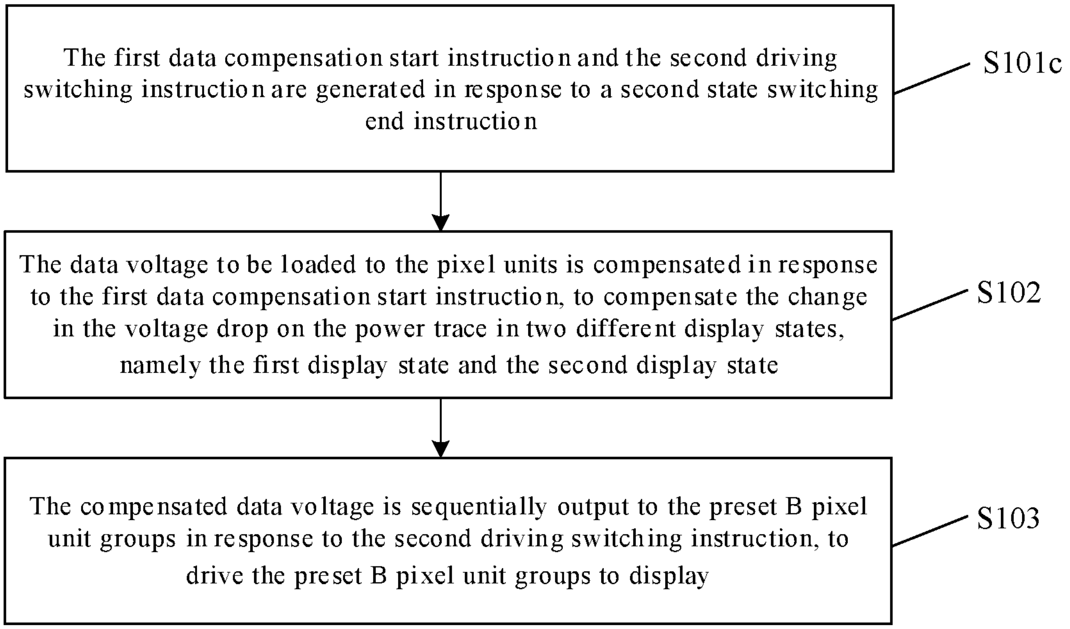
FIG. 14 is another flowchart of a data driving method according to an embodiment of the present disclosure.
Figure 15:
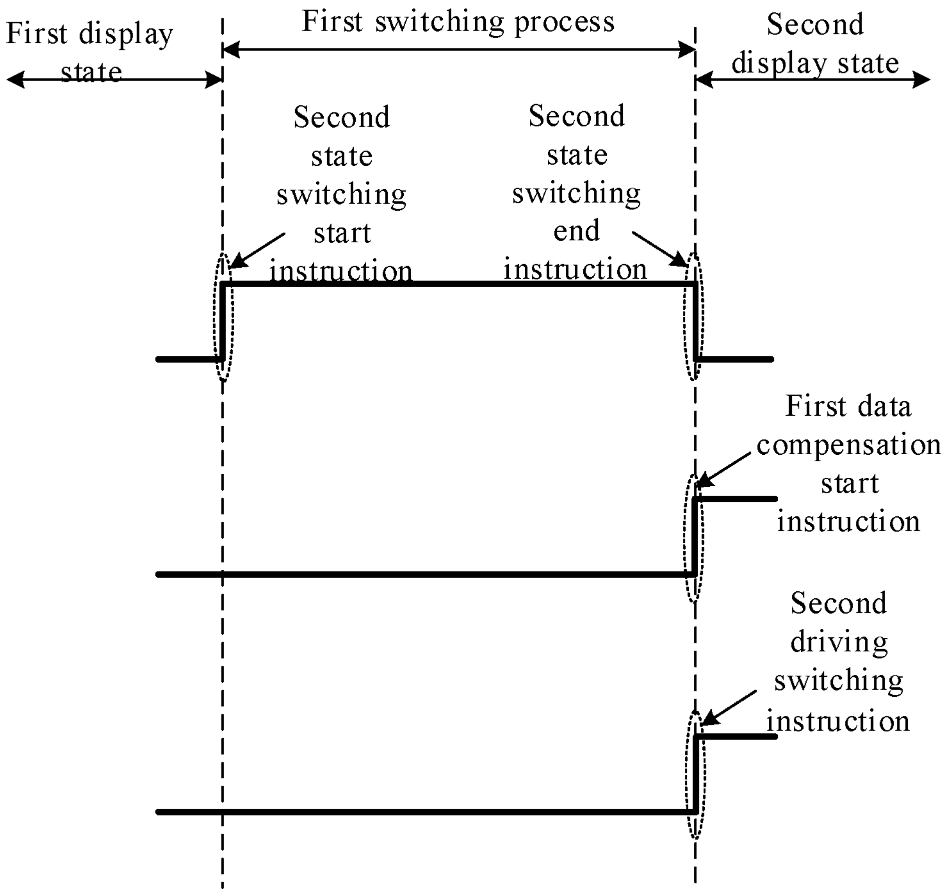
FIG. 15 is a timing diagram corresponding to the data driving method shown in FIG. 14.

FIG. 14 is another flowchart of a data driving method according to an embodiment of the present disclosure; FIG. 15 is a timing diagram corresponding to the data driving method shown in FIG. 14. As shown in FIG. 14 and FIG. 15, in the data driving method shown in FIG. 14, the step S101*a* in the data driving method shown in FIG. 10 is replaced by step S101*c*, which will be described in detail below.

Step S101*c*, the first data compensation start instruction and the second driving switching instruction are generated in response to a second state switching end instruction.

Unlike the embodiment shown in FIG. 10 where the source driver generates the first data compensation start instruction and the second driving switching instruction at the beginning of the first switching process, in the embodiment shown in FIG. 14, the source driver generates the first data compensation start instruction and the second driving switching instruction at the end of the first switching process. That is, both the starting of the compensation for the data voltage and the switching of the number of the pixel unit groups for displaying are performed at the end of the first switching process.

It should be noted that at the end of the first switching process, the switching control unit in the display apparatus generates the second state switching end instruction, which indicates that the first switching process ends, the switching to the second display state is completed for the display apparatus, and the display apparatus then operates in the second display state.

With continuing reference to the data driving method shown in FIGS. 10, 12, and 14, in some embodiments, step S102 specifically includes: compensating the data voltage to be loaded to pixel units according to a preset first compensation voltage, to obtain a compensated data voltage Vdata':

$$Vdata' = Vdata - Vcomp1$$

Vdata is a data voltage before the compensation, and Vcomp1 is the preset first compensation voltage; wherein when A<B, Vcomp1>0; when A>B, Vcomp1<0.

As can be seen from the foregoing description of FIGS. 4 and 5, when A<B, the number of pixel unit groups for displaying after the first switching process increases. For the jth pixel unit group, the power voltage actually received by the jth pixel unit group decreases, and the light emitting luminance of the pixel units in the jth pixel unit group decreases. Based on this, the data voltage may be reduced while the number of the pixel unit groups for displaying is switched, so that the light emitting luminance of the jth pixel unit group is increased, and the reduction in the light emitting luminance of the jth pixel unit group due to the reduction in the actually received power voltage can be compensated, and the luminance jump can be effectively avoided. When A>B, the number of pixel unit groups for displaying after the first switching process is reduced. For the jth pixel unit group, the power voltage actually received by the jth pixel unit group increases, and the light emitting luminance of the pixel units in the jth pixel unit group increases. Based on this, the data voltage may be increased while the number of the pixel unit groups for displaying is switched, so that the light emitting luminance of the jth pixel unit group is decreased, and the increase in the light emitting luminance of the jth pixel unit group due to the increase in the actually received power voltage can be compensated, and the luminance jump can be effectively avoided.

In some embodiments, the preset first compensation voltage is related to a maximum voltage drop on the power trace in the first display state and a maximum voltage drop on the power trace in the second display state.

In some embodiments, the preset first compensation voltage Vcomp1 is:

$$Vcomp1 = \alpha 1 \times \Delta Vmax\_B - \beta 1 \times \Delta Vmax\_A$$

ΔVmax_B is the maximum voltage drop on the power trace in the second display state, ΔVmax_A is the maximum voltage drop on the power trace in the first display state, and α1 and β1 are preset constants, respectively.

It should be noted that ΔVmax_B and ΔVmax_A may be measured through a preliminary experiment, and values of α1 and β1 may be set according to actual requirements for the compensation.

Figure 16:
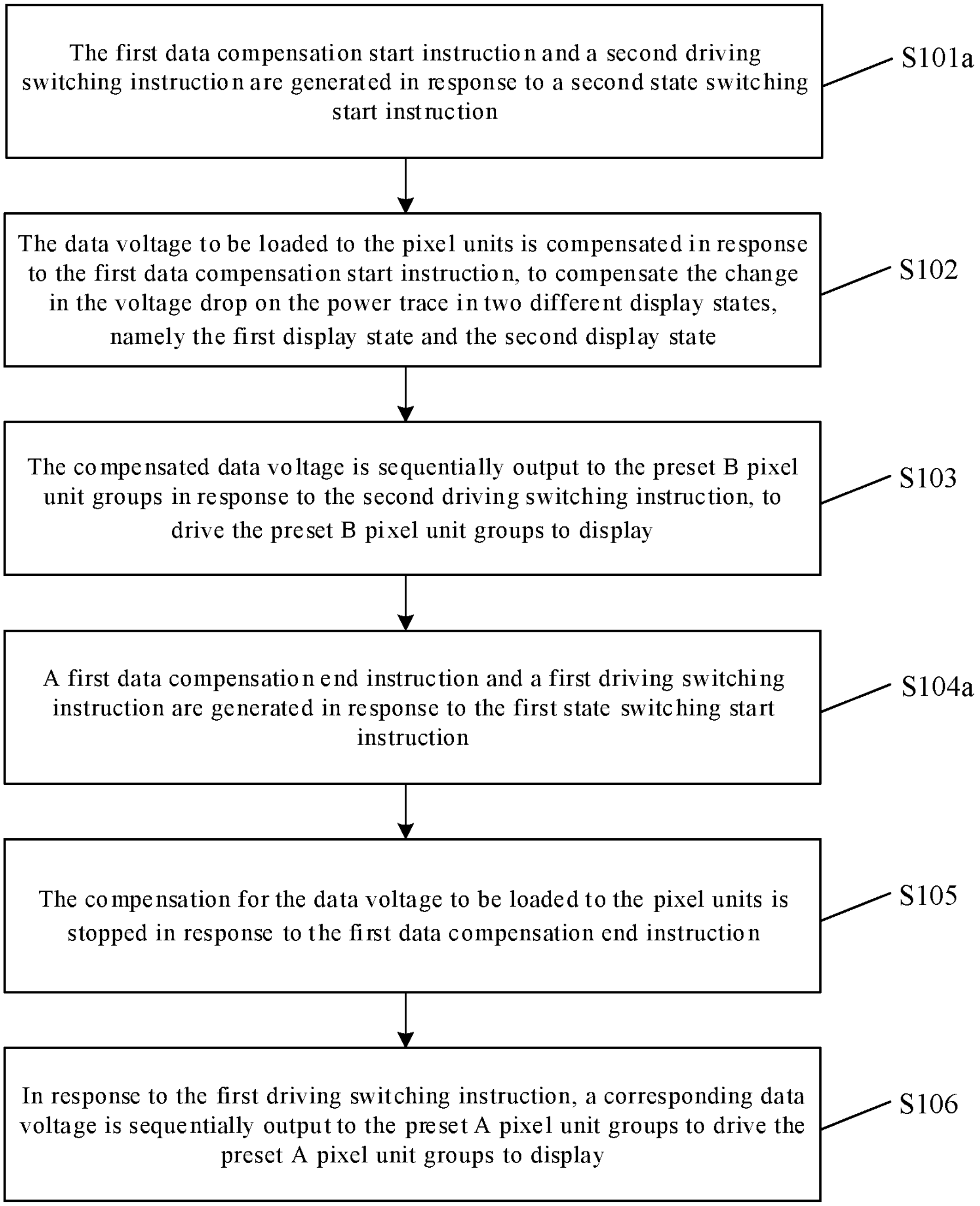
FIG. 16 is another flowchart of a data driving method according to an embodiment of the present disclosure.
Figure 17:
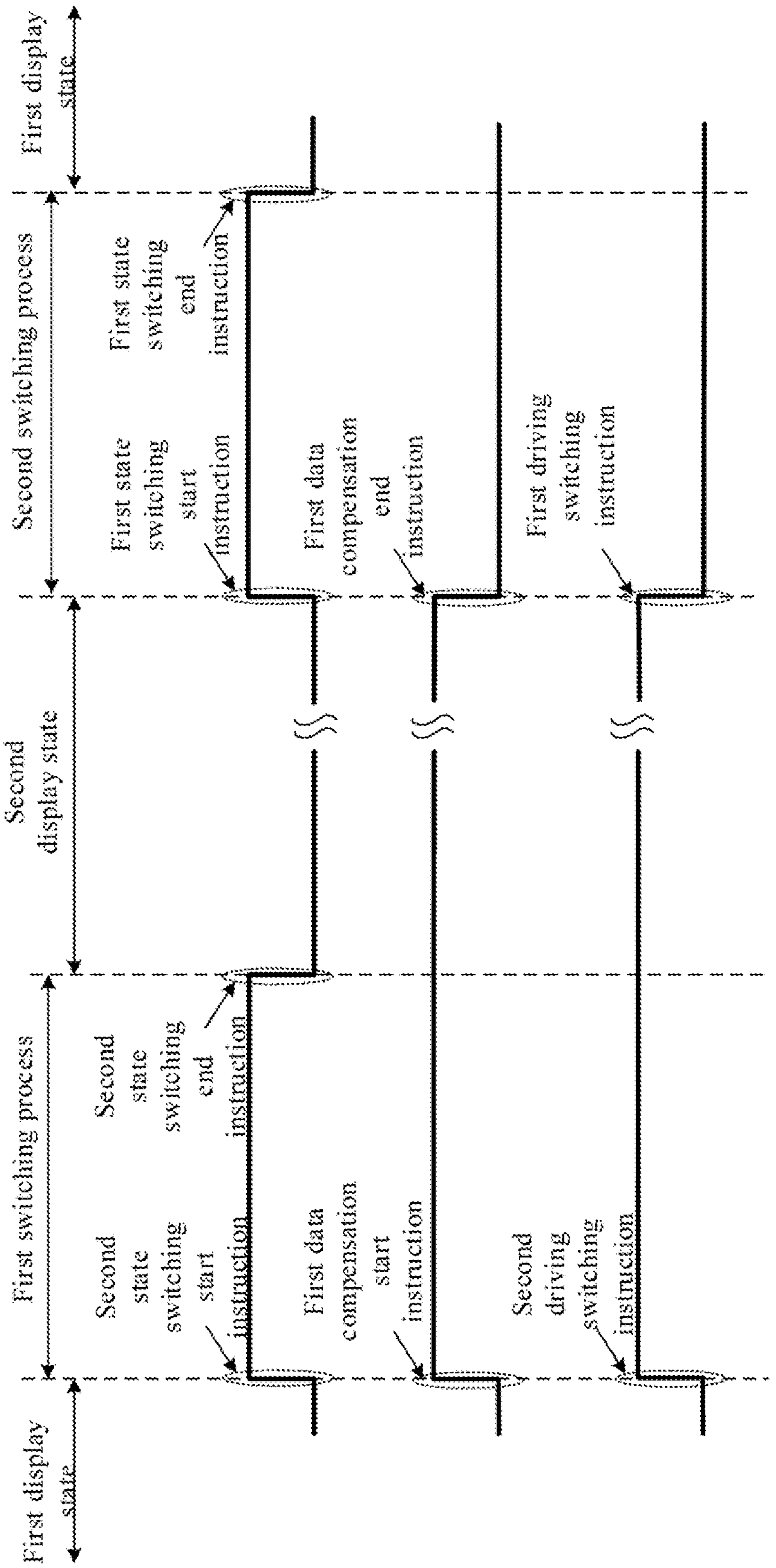
FIG. 17 is a timing diagram corresponding to the data driving method shown in FIG. 16.

FIG. 16 is another flowchart of a data driving method according to an embodiment of the present disclosure; FIG. 17 is a timing diagram corresponding to the data driving method shown in FIG. 16. As shown in FIG. 16 and FIG. 17, the data driving method shown in FIG. 16 not only includes step S101*a*, step S102 and step S103 in FIG. 10, but after step S103, also includes: step S104*a*, step S105, and step S106, which will be described in detail below.

Step S104*a*, a first data compensation end instruction and a first driving switching instruction are generated in response to the first state switching start instruction.

After the first switching process ends, the display apparatus operates in the second display state. In the process of the display apparatus operating in the second display state, the source driver continuously compensates the data voltage in the compensation way in step S102, and transmits the compensated data voltage to the preset B pixel unit groups to drive the preset B pixel unit groups to display.

At a certain moment, in response to a preset second operation instruction (a pre-designed operation instruction corresponding to the second switching process), the switching control unit in the display apparatus generates the first state switching start instruction, which indicates that the second switching process is started. Accordingly, the display apparatus is also switched between the physical states (for example, the folding operation for the foldable screen, the restoring operation for the foldable screen, the sliding and storing operation for the rollable screen, the sliding and unfolding operation for the rollable screen, the bending operation for the scrollable screen, or the unfolding operation for the scrollable screen, and the specific switching operation corresponds to the preset first operation instruction). The source driver generates the first data compensation end instruction and the first driving switching instruction in response to the first state switching start instruction.

Step S105, the compensation for the data voltage to be loaded to the pixel units is stopped in response to the first data compensation end instruction.

Step S106, in response to the first driving switching instruction, a corresponding data voltage is sequentially output to the preset A pixel unit groups to drive the preset A pixel unit groups to display.

That is, at the beginning of the second switching process, the source driver stops compensating the data voltage; meanwhile, the source driver also provides the data voltage to the preset B pixel unit groups to drive the preset B pixel unit groups to display, and switches to provide the data voltage to the preset A pixel unit groups to drive the preset A pixel unit groups to display. That is, both the end of the compensation for the data voltage and the switching of the number of the pixel unit groups for displaying are performed at the beginning of the second switching process.

In the embodiment of the present disclosure, when the number of the pixel unit groups for displaying is switched from B to A, A voltage drop on A power voltage line is restored to the state before the compensation for the data voltage. In order to avoid the abrupt change in the light emitting luminance of the pixel units, it necessarily stops compensating the data voltage.

Figure 18:
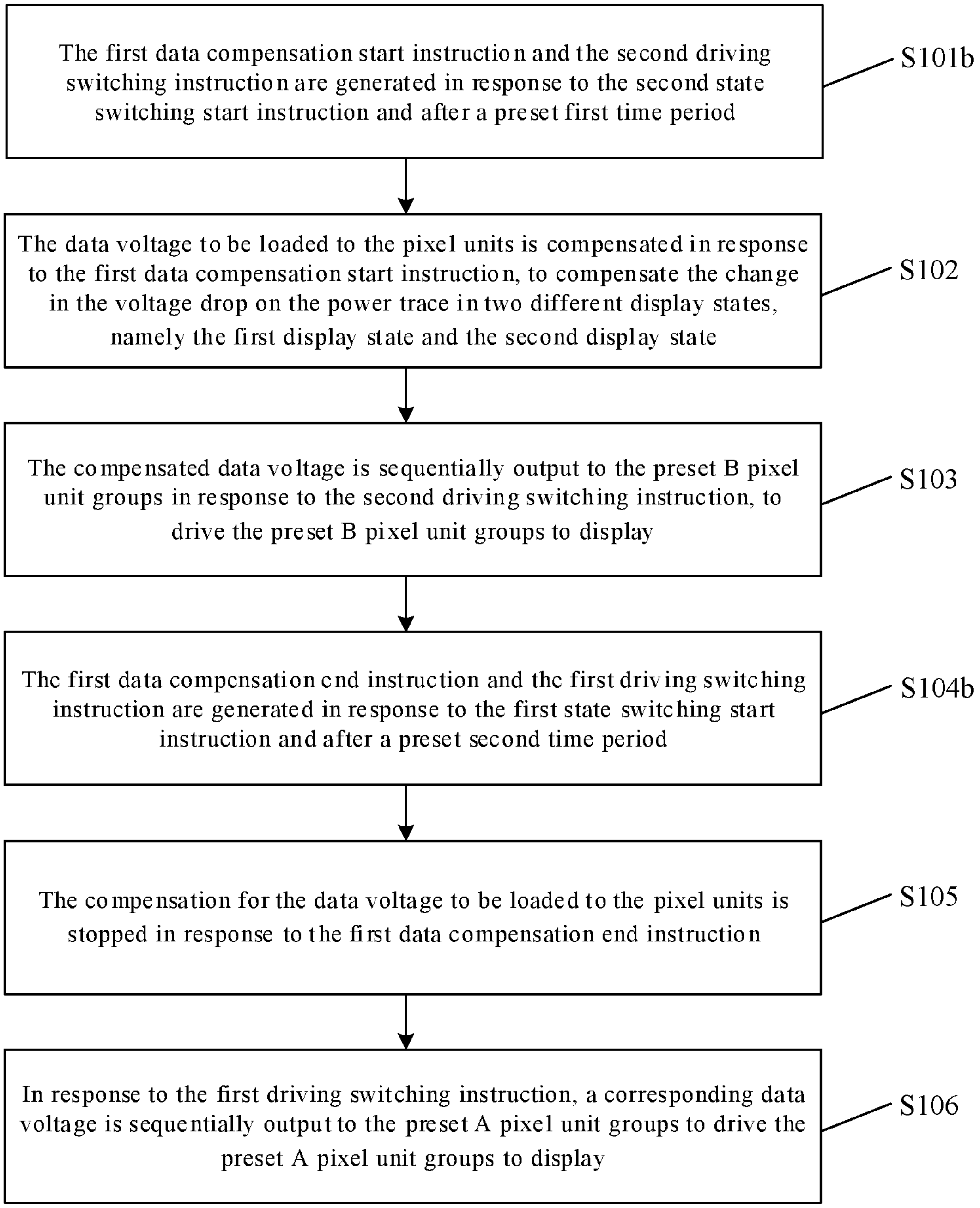
FIG. 18 is another flowchart of a data driving method according to an embodiment of the present disclosure.
Figure 19:
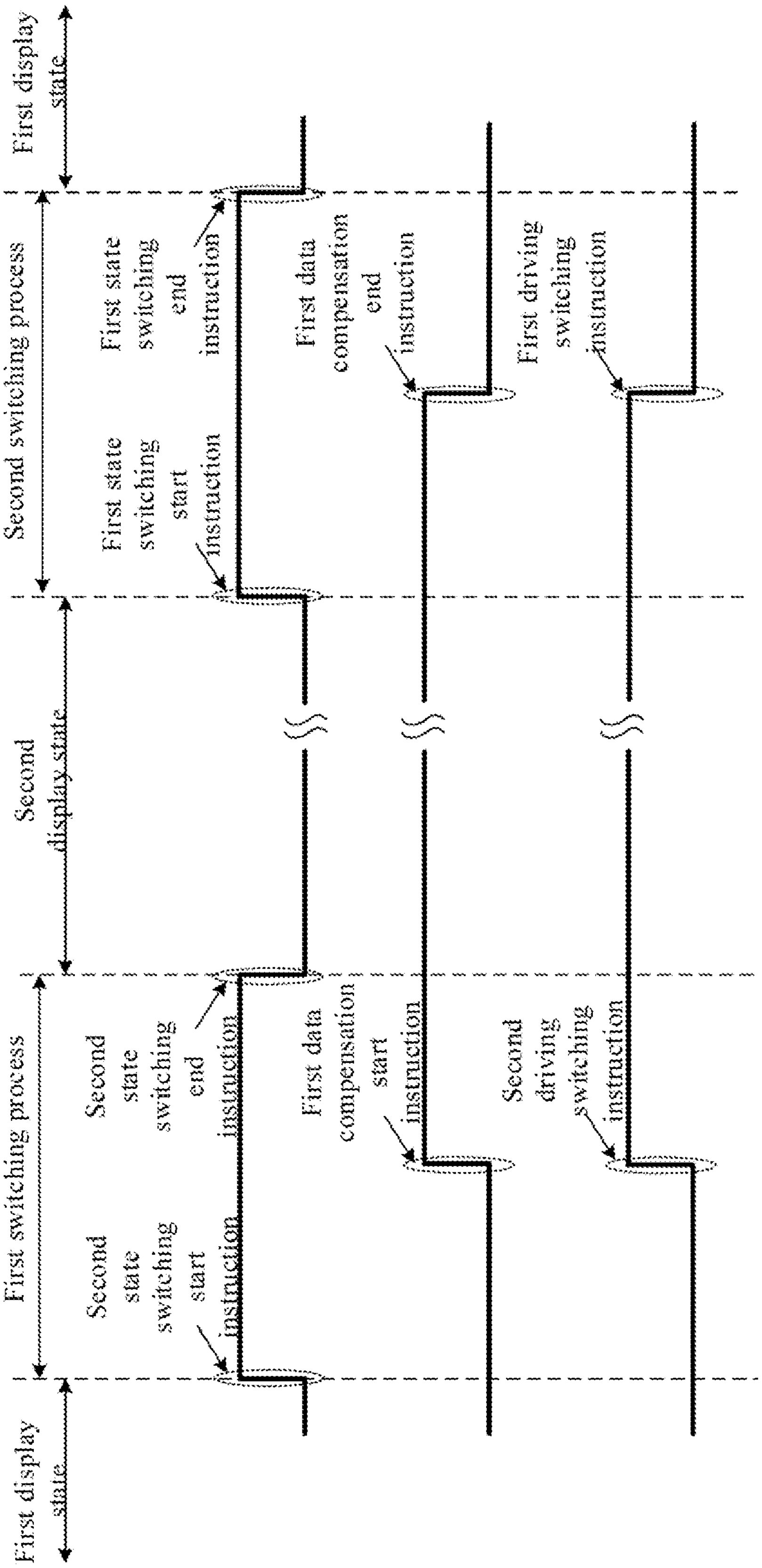
FIG. 19 is a timing diagram corresponding to the data driving method shown in FIG. 18.

FIG. 18 is another flowchart of a data driving method according to an embodiment of the present disclosure; FIG. 19 is a timing diagram corresponding to the data driving method shown in FIG. 18. As shown in FIG. 18 and FIG. 19, in the data driving method shown in FIG. 18, the steps S101*a* and S104*a* in the data driving method shown in FIG. 16 are replaced by steps S101*b* and S104*b*, respectively. For the description of step S101*b*, reference may be made to the data driving method shown in FIG. 12, and only step S104*b* will be described in detail below.

Step S104*b*, the first data compensation end instruction and the first driving switching instruction are generated in response to the first state switching start instruction and after a preset second time period.

Unlike the embodiment shown in FIG. 16 where the source driver generates the first data compensation end instruction and the first driving switching instruction at the beginning of the second switching process, in the embodiment shown in FIG. 18, the source driver generates the first data compensation end instruction and the second driving switching instruction at the beginning of the second switching process and after the preset second time period (its specific value may be preset according to actual needs). That is, both the end of the compensation for the data voltage and the switching of the number of the pixel unit groups for displaying are performed at the beginning of the second switching process and after the preset second time period.

Figure 20:
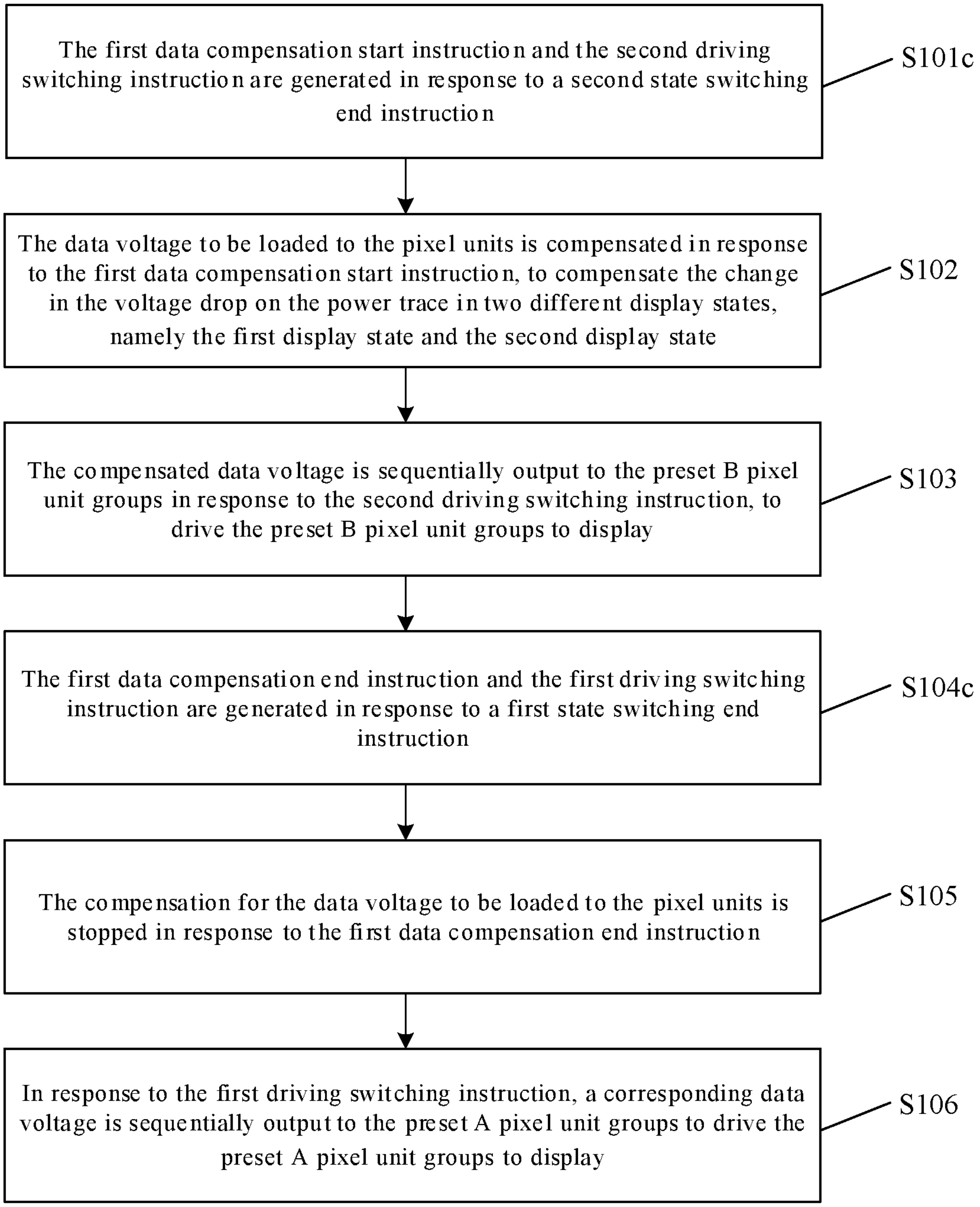
FIG. 20 is another flowchart of a data driving method according to an embodiment of the present disclosure.
Figure 21:
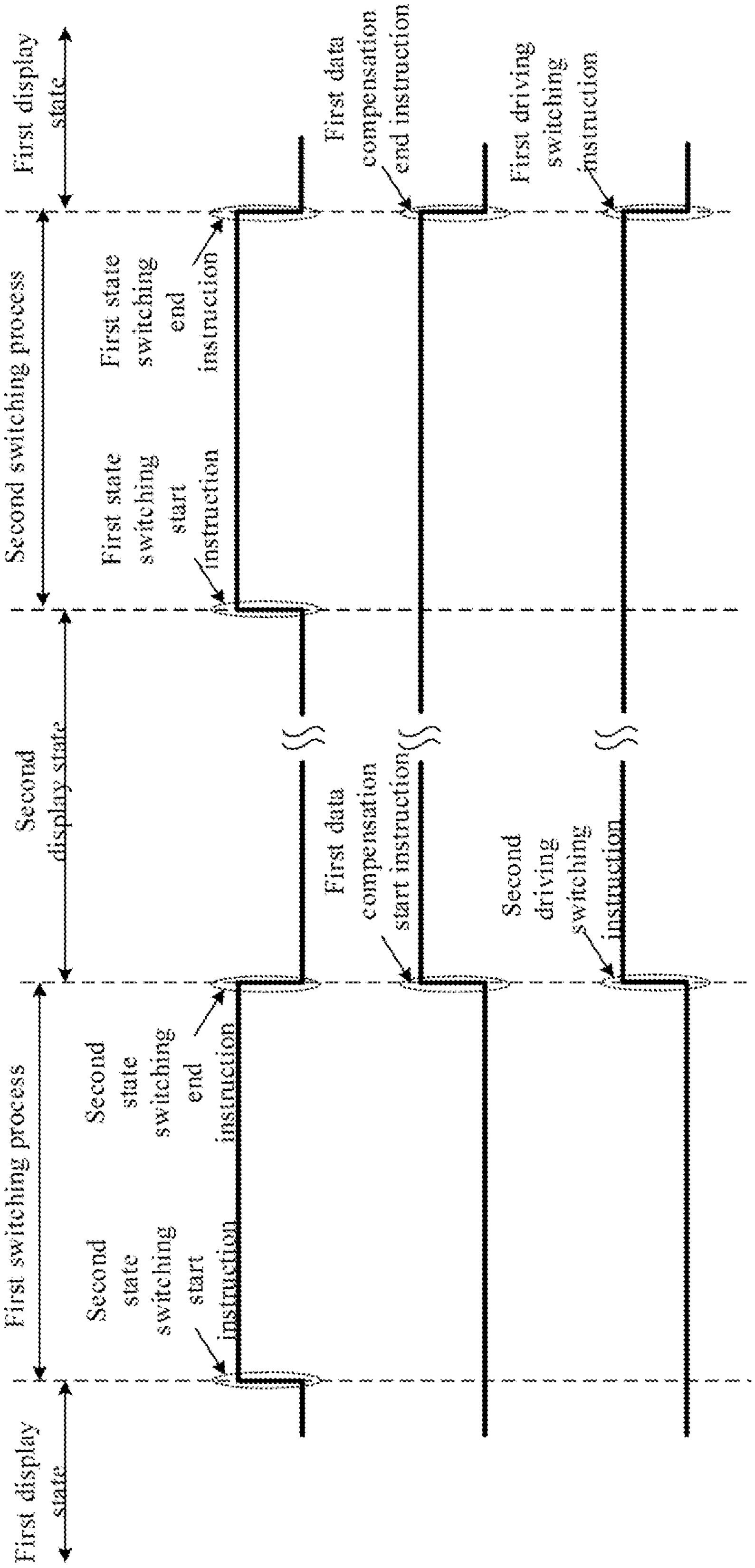
FIG. 21 is a timing diagram corresponding to the data driving method shown in FIG. 20.

FIG. 20 is another flowchart of a data driving method according to an embodiment of the present disclosure; FIG. 21 is a timing diagram corresponding to the data driving method shown in FIG. 20. As shown in FIG. 20 and FIG. 21, in the data driving method shown in FIG. 20, the steps S101*a* and S104*a* in the data driving method shown in FIG. 16 are replaced by steps S101*c* and S104*c*, respectively. For the description of step S101*c*, reference may be made to the data driving method shown in FIG. 14, and only step S104*c* will be described in detail below.

Step S104*c*, the first data compensation end instruction and the first driving switching instruction are generated in response to a first state switching end instruction.

Unlike the embodiment shown in FIG. 16 where the source driver generates the first data compensation end instruction and the first driving switching instruction at the beginning of the second switching process, in the embodiment shown in FIG. 20, the source driver generates the first data compensation end instruction and the first driving switching instruction at the end of the second switching process. That is, both the end of the compensation for the data voltage and the switching of the number of the pixel unit groups for displaying are performed at the end of the second switching process.

It should be noted that at the end of the second switching process, the switching control unit in the display apparatus generates the first state switching end instruction, which indicates that the second switching process ends, the switching to the first display state is completed for the display apparatus, and the display apparatus then operates in the first display state.

In the embodiment of the present disclosure, steps S101*a* to S103 in FIG. 10, steps S101*b* to S103 in FIG. 12 or steps S101*c* to S103 in FIG. 14 may be combined with steps S104*a* to S106 in FIG. 16, steps S104*b* to S106 in FIG. 18 or steps S104*c* to S106 in FIG. 20, and the technical solutions obtained by the combination also belong to the protection scope of the present disclosure. For example, a combination of steps S101*a* to S103 in FIG. 10 and steps S104*b* to S106 in FIG. 18 may obtain a new technical solution.

Figure 22:
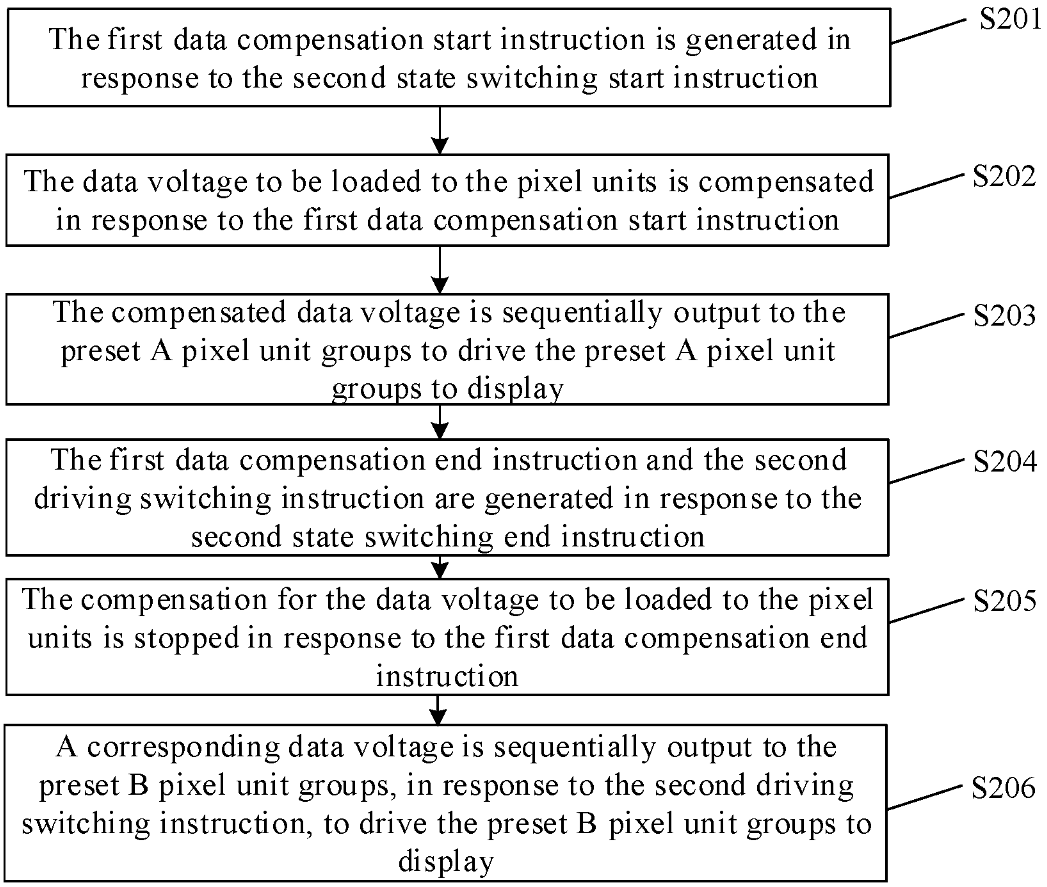
FIG. 22 is another flowchart of a data driving method according to an embodiment of the present disclosure.
Figure 23:
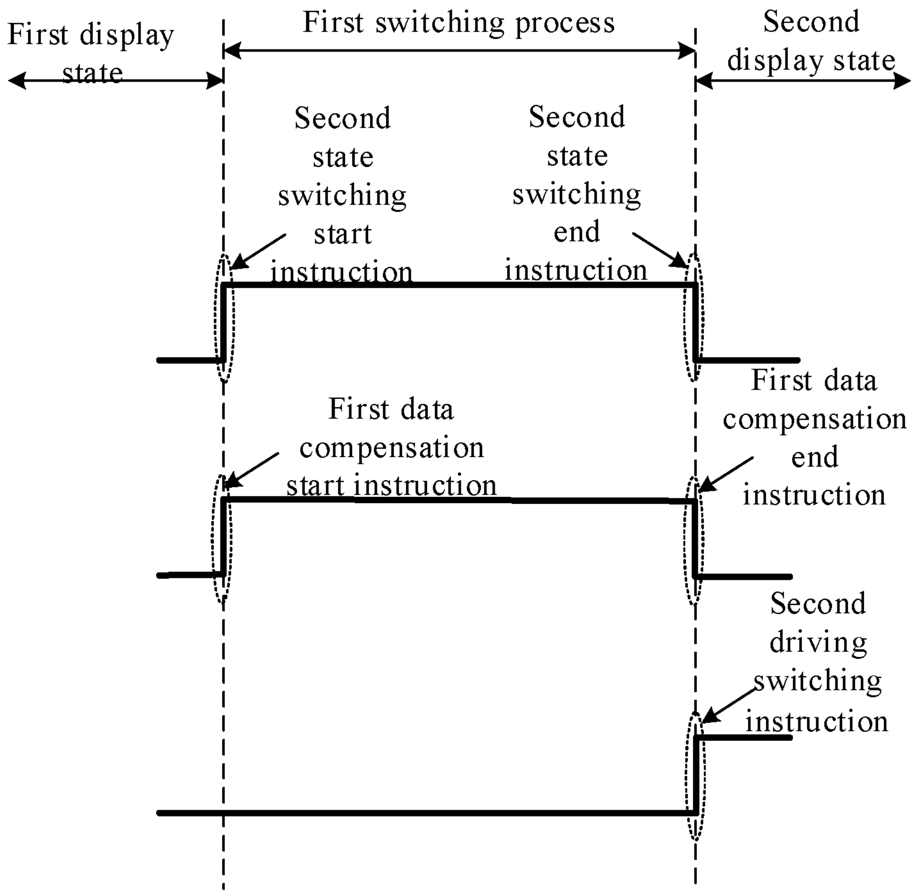
FIG. 23 is a timing diagram corresponding to the data driving method shown in FIG. 22.

FIG. 22 is another flowchart of a data driving method according to an embodiment of the present disclosure; FIG. 23 is a timing diagram corresponding to the data driving method shown in FIG. 22. As shown in FIG. 22 and FIG. 23, the data driving method includes:

Step S201, the first data compensation start instruction is generated in response to the second state switching start instruction.

Step S202, the data voltage to be loaded to the pixel units is compensated in response to the first data compensation start instruction.

Step S203, the compensated data voltage is sequentially output to the preset A pixel unit groups to drive the preset A pixel unit groups to display.

Step S204, the first data compensation end instruction and the second driving switching instruction are generated in response to the second state switching end instruction.

Step S205, the compensation for the data voltage to be loaded to the pixel units is stopped in response to the first data compensation end instruction.

Step S206, a corresponding data voltage is sequentially output to the preset B pixel unit groups, in response to the second driving switching instruction, to drive the preset B pixel unit groups to display.

Unlike the technical solutions where the first data compensation start instruction and the second driving switching instruction are generated synchronously as in the above embodiments, in this embodiment, the first data compensation start instruction is generated at the beginning of the first switching process to compensate the data voltage, and the first data compensation end instruction and the second driving switching instruction are generated at the end of the first switching process, to switch the number of pixel unit groups for displaying (the number of pixel unit groups for displaying is switched from A to B) and stop compensating the data voltage.

In some embodiments, step S202 specifically includes: compensating the data voltage to be loaded to pixel units according to a preset first compensation voltage and a first compensation coefficient, to obtain a compensated data voltage Vdata':

$$Vdata' = Vdata + Vcomp1 \times P1(t1)$$

Vdata is a data voltage before the compensation, and Vcomp1 is the preset first compensation voltage; P1(t1) is the first compensation coefficient with a value in positive correlation with an elapsed time period t1 of the first switching process, $0<P1(t1)\leq 1$, $0<t1\leq T1$; and T1 is a total time period of the first switching process; wherein when A<B, Vcomp1>0; when A>B, Vcomp1<0.

As can be seen from the foregoing description of FIGS. 4 and 5, when A<B, the number of pixel unit groups for displaying after the first switching process increases. For the jth pixel unit group, the power voltage actually received by the jth pixel unit group decreases, and the light emitting luminance of the pixel units in the jth pixel unit group decreases. Based on this, the first compensation coefficient (the value of Vcomp1 is positive) is continuously increased in the first switching process, so that the compensated data voltage may be continuously increased and the light emitting luminance of the pixel units may be continuously decreased. At the end of the first switching process, the compensation for the data voltage is stopped and the number of the pixel unit groups for displaying is switched. In the first switching process (including the beginning and the end of the first switching process), the light emitting luminance of the preset A pixel unit groups will be continuously reduced without the luminance jump. It should be noted that although the light emitting luminance of the pixel units is reduced due to the switching of the number of the pixel unit groups for displaying at the end of the first switching process, since the light emitting luminance of the pixel units is continuously reduced through the compensation for the data voltage before the end of the first switching process, a difference between the light emitting luminance of the pixel units at the end of the first switching process and the light emitting luminance of the pixel units in the previous frame is small, and thus, the luminance jump does not occur.

When A>B, the number of pixel unit groups for displaying after the first switching process decreases. For the jth pixel unit group, the power voltage actually received by the jth pixel unit group increases, and the light emitting luminance of the pixel units in the jth pixel unit group increases. Based on this, the first compensation coefficient (the value of Vcomp1 is negative) is continuously increased in the first switching process, so that the compensated data voltage may be continuously decreased and the light emitting luminance of the pixel units may be continuously increased. At the end of the first switching process, the compensation for the data voltage is stopped and the number of the pixel unit groups for displaying is switched. In the first switching process (including the beginning and the end of the first switching process), the light emitting luminance of the preset A pixel unit groups will be continuously increased without the luminance jump. It should be noted that although the light emitting luminance of the pixel units is increased due to the switching of the number of the pixel unit groups for displaying at the end of the first switching process, since the light emitting luminance of the pixel units is continuously increased through the compensation for the data voltage before the end of the first switching process, a difference between the light emitting luminance of the pixel units at the end of the first switching process and the light emitting luminance of the pixel units in the previous frame is small, and thus, the luminance jump does not occur.

In some embodiments, the preset first compensation voltage is related to a maximum voltage drop on the power trace in the first display state and a maximum voltage drop on the power trace in the second display state.

In some embodiments, the preset first compensation voltage Vcomp1 is:

$$Vcomp1 = \alpha 1 \times \Delta Vmax\_B - \beta 1 \times \Delta Vmax\_A$$

ΔVmax_B is the maximum voltage drop on the power trace in the second display state, ΔVmax_A is the maximum voltage drop on the power trace in the first display state, and α1 and β1 are preset constants, respectively.

In some embodiments, the first compensation coefficient P1(t1) is: $P1(t1)=(t1/T1)^{\gamma}$. γ is a gamma value configured for the display apparatus.

Figure 24:
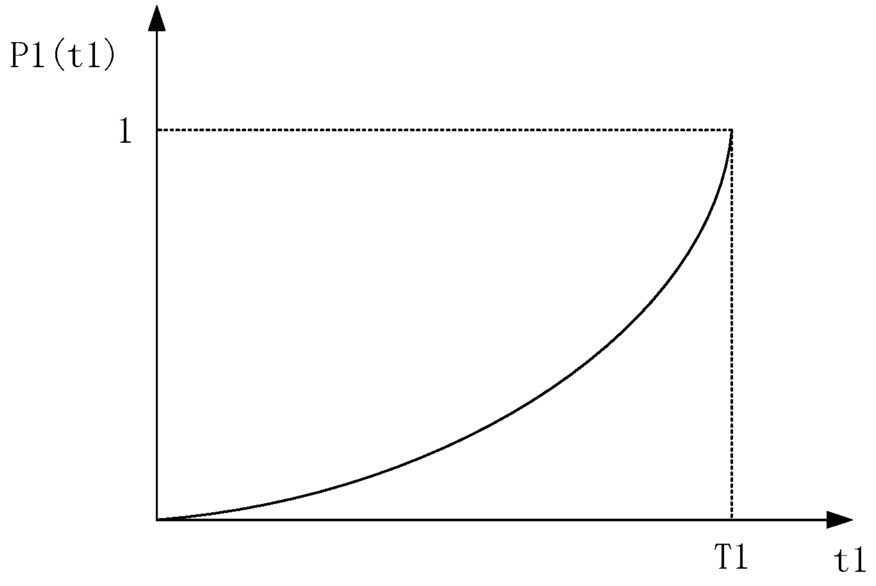
FIG. 24 is a schematic diagram illustrating a curve of a variation of a first compensation coefficient P1(t1) with an elapsed time period t1 of a first switching process according to an embodiment of the present disclosure.

FIG. 24 is a schematic diagram illustrating a curve of a variation of a first compensation coefficient P1(t1) with an elapsed time period t1 of a first switching process according to an embodiment of the present disclosure. As shown in FIG. 24, the first compensation coefficient P1(t1) has a non-linear relationship with the elapsed time period t1 of the first switching process. Generally, the gamma value γ configured for the display apparatus is greater than or equal to 1.5. For example, the gamma value γ is 1.8 or 2.2 or the like.

Figure 25:
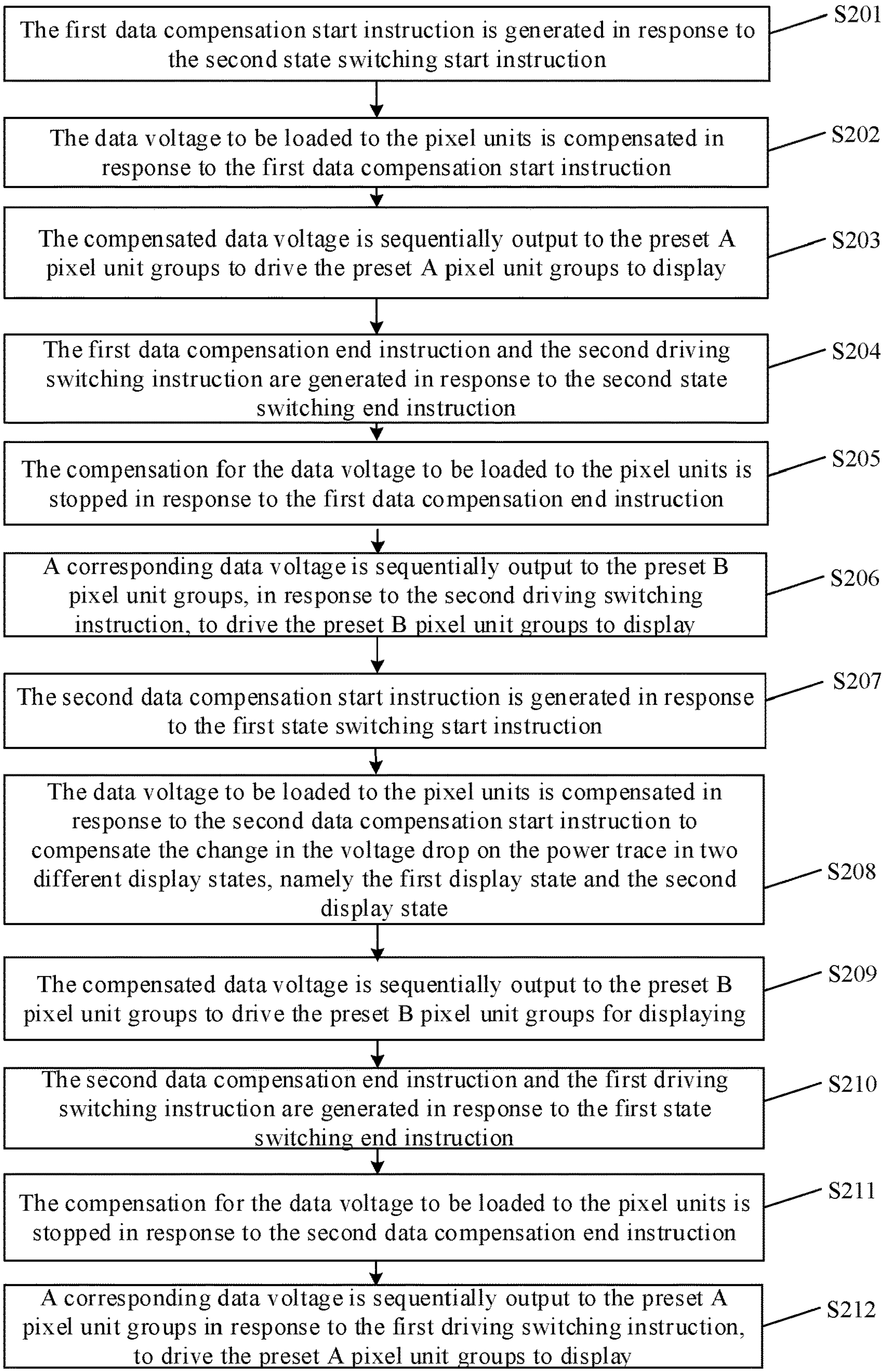
FIG. 25 is another flowchart of a data driving method according to an embodiment of the present disclosure.
Figure 26:
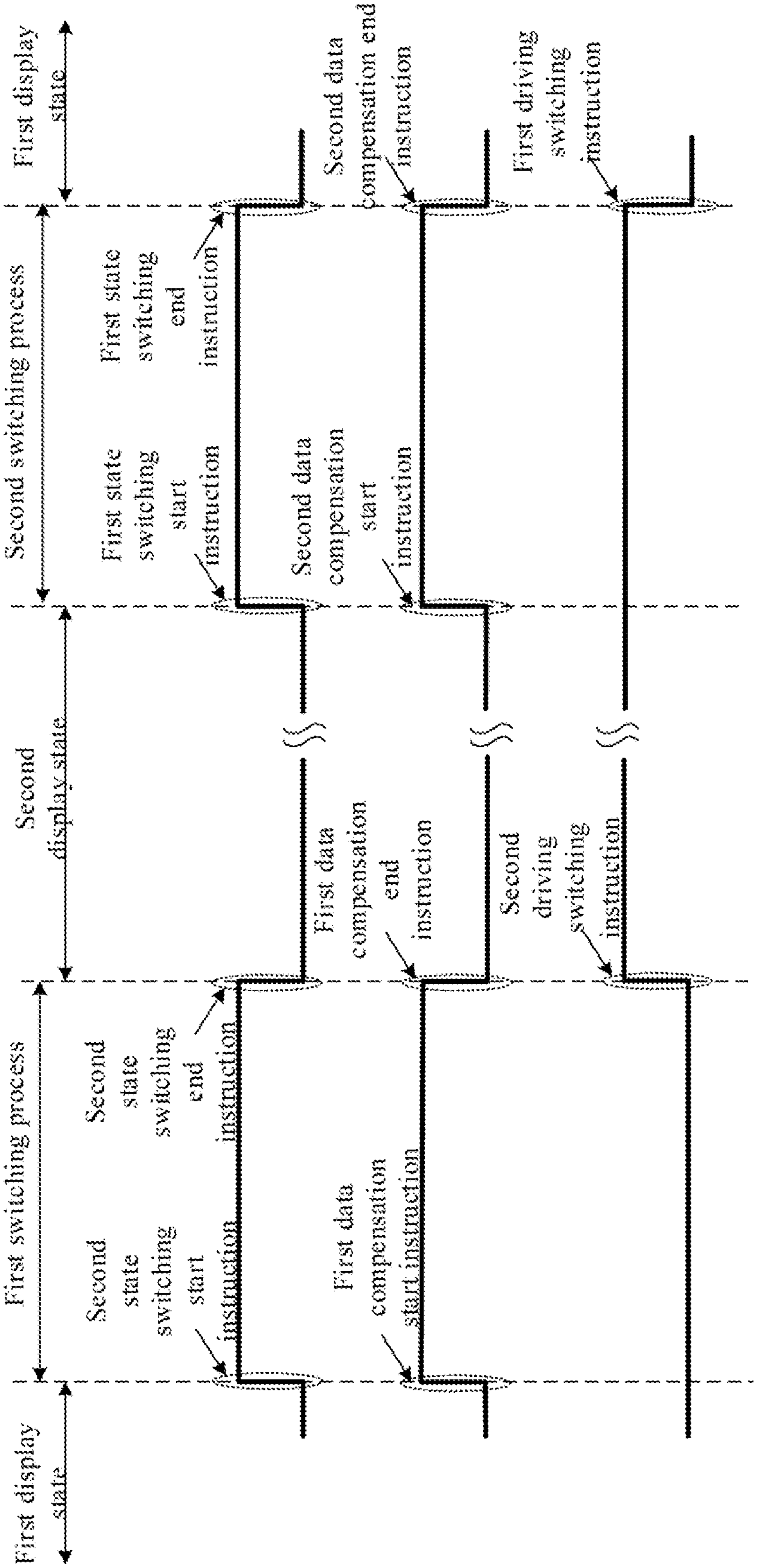
FIG. 26 is a timing diagram corresponding to the data driving method shown in FIG. 25.

FIG. 25 is another flowchart of a data driving method according to an embodiment of the present disclosure; FIG. 26 is a timing diagram corresponding to the data driving method shown in FIG. 25. As shown in FIG. 25 and FIG. 26, the data driving method includes steps S201 to S206 in the data driving method shown in FIG. 22, and also includes steps S207 to S2012, which are described in detail below.

Step S207, the second data compensation start instruction is generated in response to the first state switching start instruction.

After the first switching process ends, the display apparatus operates in the second display state. In the process that the display apparatus operates in the second display state, the source driver does not compensate the data voltage, and transmits the data voltage to the preset B pixel unit groups so as to drive the preset B pixel unit groups to display.

At a certain moment, in response to a preset second operation instruction (a pre-designed operation instruction corresponding to the second switching process), the switching control unit in the display apparatus generates the first state switching start instruction, which indicates that the second switching process is started. Accordingly, the display apparatus is also switched between the physical states (for example, the folding operation for the foldable screen, the restoring operation for the foldable screen, the sliding and storing operation for the rollable screen, the sliding and unfolding operation for the rollable screen, the bending operation for the scrollable screen, or the unfolding operation for the scrollable screen, and the specific switching operation corresponds to the preset first operation instruction). The source driver generates the second data compensation start instruction in response to the first state switching start instruction.

Step S208, the data voltage to be loaded to the pixel units is compensated in response to the second data compensation start instruction to compensate the change in the voltage drop on the power trace in two different display states, namely the first display state and the second display state.

Step S209, the compensated data voltage is sequentially output to the preset B pixel unit groups to drive the preset B pixel unit groups for displaying.

Step S210, the second data compensation end instruction and the first driving switching instruction are generated in response to the first state switching end instruction.

Step S211, the compensation for the data voltage to be loaded to the pixel units is stopped in response to the second data compensation end instruction.

Step S212, a corresponding data voltage is sequentially output to the preset A pixel unit groups in response to the first driving switching instruction, to drive the preset A pixel unit groups to display.

In the present embodiment, the second data compensation start instruction is generated at the beginning of the second switching process to compensate the data voltage, and the second data compensation end instruction and the first driving switching instruction are generated at the end of the second switching process, to switch the number of pixel unit groups for displaying (the number of pixel unit groups for displaying is switched from B to A) and stop compensating the data voltage.

In some embodiments, step S208 specifically includes: compensating the data voltage to be loaded to pixel units according to a preset second compensation voltage and a second compensation coefficient, to obtain a compensated data voltage Vdata':

$$Vdata' = Vdata + Vcomp2 \times P2(t2)$$

Vdata is a data voltage before the compensation, and Vcomp2 is the preset first compensation voltage; P2(t2) is the second compensation coefficient with a value in positive correlation with an elapsed time period t2 of the second switching process, $0<P2(t2)\leq 1$, $0<t2\leq T2$; and T2 is a total time period of the second switching process; wherein when A<B, Vcomp2<0; when A>B, Vcomp2>0.

As can be seen from the foregoing description of FIGS. 4 and 5, when A<B, the number of pixel unit groups for displaying after the second switching process decreases. For the jth pixel unit group, the power voltage actually received by the jth pixel unit group increases, and the light emitting luminance of the pixel units in the jth pixel unit group increases. Based on this, the first compensation coefficient (the value of Vcomp1 is negative) is continuously increased in the second switching process, so that the compensated data voltage may be continuously decreased and the light emitting luminance of the pixel units may be continuously increased. At the end of the second switching process, the compensation for the data voltage is stopped and the number of the pixel unit groups for displaying is switched. In the second switching process (including the beginning and the end of the second switching process), the light emitting luminance of the preset B pixel unit groups will be continuously increased without the luminance jump. It should be noted that although the light emitting luminance of the pixel units is increased due to the switching of the number of the pixel unit groups for displaying at the end of the first switching process, since the light emitting luminance of the pixel units is continuously increased through the compensation for the data voltage before the end of the second switching process, a difference between the light emitting luminance of the pixel units at the end of the second switching process and the light emitting luminance of the pixel units in the previous frame is small, and thus, the luminance jump does not occur.

When A>B, the number of pixel unit groups for displaying after the second switching process increases. For the jth pixel unit group, the power voltage actually received by the jth pixel unit group decreases, and the light emitting luminance of the pixel units in the jth pixel unit group decreases. Based on this, the first compensation coefficient (the value of Vcomp1 is positive) is continuously increased in the second switching process, so that the compensated data voltage may be continuously increased and the light emitting luminance of the pixel units may be continuously decreased. At the end of the second switching process, the compensation for the data voltage is stopped and the number of the pixel unit groups for displaying is switched. In the second switching process (including the beginning and the end of the second switching process), the light emitting luminance of the preset B pixel unit groups will be continuously reduced without the luminance jump. It should be noted that although the light emitting luminance of the pixel units is reduced due to the switching of the number of the pixel unit groups for displaying at the end of the second switching process, since the light emitting luminance of the pixel units is continuously reduced through the compensation for the data voltage before the end of the second switching process, a difference between the light emitting luminance of the pixel units at the end of the second switching process and the light emitting luminance of the pixel units in the previous frame is small, and thus, the luminance jump does not occur.

In some embodiments, the preset second compensation voltage is related to a maximum voltage drop on the power trace in the first display state and a maximum voltage drop on the power trace in the second display state.

In some embodiments, the preset second compensation voltage Vcomp2 is:

$$Vcomp2 = \alpha 2 \times \Delta\text{Vmax\_A} - \beta 2 \times \Delta\text{Vmax\_B}$$

ΔVmax_A is the maximum voltage drop on the power trace in the first display state, ΔVmax_B is the maximum voltage drop on the power trace in the second display state, and α2 and β2 are preset constants, respectively.

It should be noted that ΔVmax_B and ≠Vmax_A may be measured through a preliminary experiment, and values of α2 and β2 may be set according to actual requirements for the compensation.

As an alternative, absolute values of the preset first compensation voltage Vcomp1 and the preset second compensation voltage Vcomp2 are equal to each other (one of Vcomp1 and Vcomp2 is positive, and the other one of Vcomp1 and Vcomp2 is negative).

In some embodiments, the second compensation coefficient P2(t2) is: $P2(t2)=(t2/T2)^{\gamma}$, where γ is the gamma value configured for the display apparatus. A curve of the second compensation coefficient P2(t2) with the elapsed time period t2 of the second switching process may be seen from FIG. 24.

Figure 27:
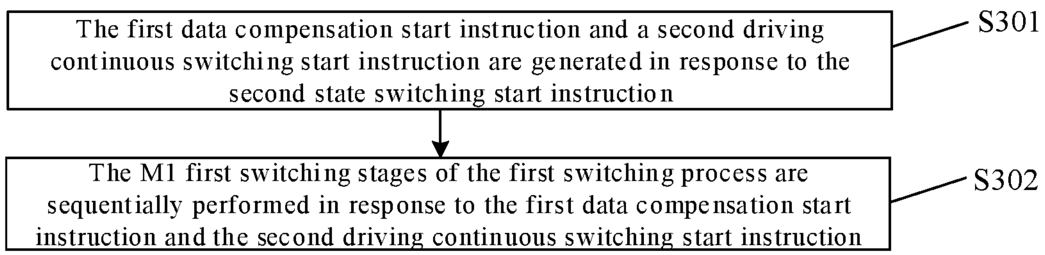
FIG. 27 is another flowchart of a data driving method according to an embodiment of the present disclosure.
Figure 28:
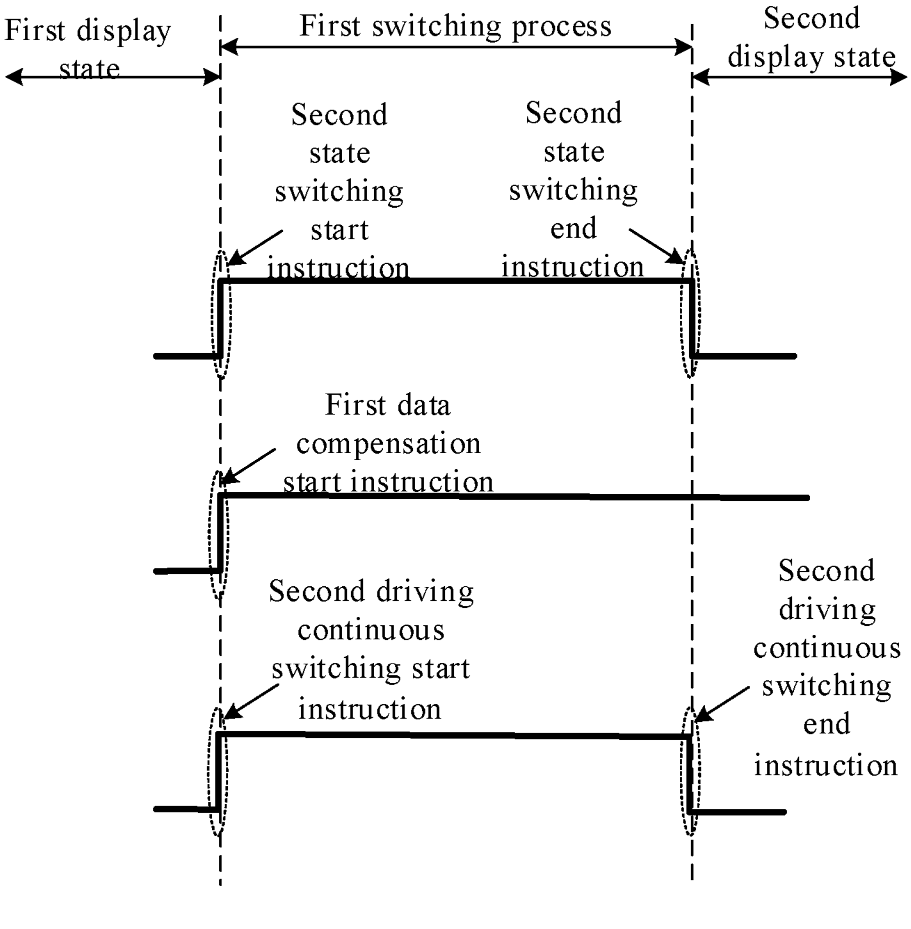
FIG. 28 is a timing diagram corresponding to the data driving method shown in FIG. 27.

FIG. 27 is another flowchart of a data driving method according to an embodiment of the present disclosure; FIG. 28 is a timing diagram corresponding to the data driving method shown in FIG. 27. As shown in FIG. 27 and FIG. 28, in some embodiments, the first switching process includes M1 first switching stages occurring in sequence; in an m1-th first switching stage, the ith pixel unit group to an (i+A−1+(B−A)×m1/M1)th pixel unit group close to the input side of the power supply are displaying, m1 is a positive integer, m1≤M1, and a value of (B−A)/M1 is an integer. The data driving method includes:

Step S301, the first data compensation start instruction and a second driving continuous switching start instruction are generated in response to the second state switching start instruction.

Step S302, the M1 first switching stages of the first switching process are sequentially performed in response to the first data compensation start instruction and the second driving continuous switching start instruction.

In step S302, the m1-th first switching stage includes: step S3021 and step S3022.

Step S3021, a data voltage to be loaded to pixel units in the ith pixel unit group to the (i+A−1+(B−A)×m1/M1)th pixel unit group close to the input side of the power supply is compensated, to obtain a compensated data voltage Vdata'.

Step S3022, the compensated data voltage is sequentially output to the ith pixel unit group to the (i+A−1+(B−A)×m1/M1)th pixel unit group close to the input side of the power supply, to drive the ith pixel unit group to the (i+A−1+(B−A)×m1/M1)th pixel unit group close to the input side of the power supply to display.

Unlike the above embodiment in which the number of pixel unit groups for displaying is directly switched from A to B at a certain time in the first switching process, in the embodiment of the present disclosure, the number of pixel unit groups for displaying is gradually switched from A to B by switching the number of pixel unit groups for displaying several times.

It should be noted that in an M1-th first switching stage, the number of pixel unit groups for displaying is switched to B, and the number of pixel unit groups for displaying is not changed in response to the second driving continuous switching stop instruction.

As an application scenario, in the first switching process, the number of pixel unit groups for displaying is switched synchronously with the switching of the physical state of the display apparatus.

As a specific example, the display panel in the display apparatus is the rollable screen shown in FIG. 9B and A<B. When the display apparatus is in the first display state, only the region C1 of the display apparatus (including the A pixel unit groups) is used for displaying, and the region C2 (including (B−A) pixel unit groups) is stored in the storage box. When the display apparatus is in the second display state, the region C1 and the region C2 of the display apparatus are all used for simultaneously displaying. In the first switching process of switching the display apparatus from the first display state to the second display state, the region C2 located inside the storage box gradually slides out of the storage box and unfolds. In practical applications, the first switching process may be divided into M1 first switching stages in advance, each of which has (B−A)/M1 pixel unit groups sliding out of the storage box and unfolding and being switched from a non-display state to the display state.

As another specific example, the display panel in the display apparatus is the rollable screen shown in FIG. 9B and A>B. When the display apparatus is in the first display state, the region C1 (including the B pixel unit groups) and the region C2 (including (A−B) pixel unit groups) of the display apparatus are all used for simultaneously displaying. When the display apparatus is in the second display state, only the region C1 of the display apparatus is used for displaying, and the region C2 is stored in the storage box. In the first switching process of switching the display apparatus from the first display state to the second display state, the region C2 is gradually slid and stored into the storage box. In practical applications, the first switching process may be divided into Ml first switching stages in advance, each of which has (B−A)/M1 pixel unit groups slid and stored into the storage box and being switched from the display state to the non-display state.

In some embodiments, step S3021 specifically includes: compensating the data voltage to be loaded to pixel units in the ith pixel unit group to the (i+A−1+(B−A)×m1/M1)th pixel unit group close to the input side of the power supply according to a preset third compensation voltage, to obtain a compensated data voltage Vdata':

$$Vdata' = Vdata - m1 \times Vcomp3$$

Vdata is a data voltage before the compensation, and Vcomp3 is the preset third compensation voltage; wherein when A<B, Vcomp3>0; when A>B, Vcomp3<0. As can be seen from the above equation, a portion for compensating the data voltage is m1×Vcomp3, which varies linearly with the variation of m1.

As can be seen from the foregoing description of FIGS. 4 and 5, when A<B, as the number of pixel unit groups for displaying increases, for the jth pixel unit group, the power voltage actually received by the jth pixel unit group decreases, and the light emitting luminance of the pixel units in the jth pixel unit group decreases. Based on this, the data voltage may be reduced while the number of the pixel unit groups for displaying is switched, so that the light emitting luminance of the jth pixel unit group is increased, and the reduction in the light emitting luminance of the jth pixel unit group due to the reduction in the actually received power voltage can be compensated, and the luminance jump can be effectively avoided. When A>B, as the number of pixel unit groups for displaying is reduced, for the jth pixel unit group, the power voltage actually received by the jth pixel unit group increases, and the light emitting luminance of the pixel units in the jth pixel unit group increases. Based on this, the data voltage may be increased while the number of the pixel unit groups for displaying is switched, so that the light emitting luminance of the jth pixel unit group is decreased, and the increase in the light emitting luminance of the jth pixel unit group due to the increase in the actually received power voltage can be compensated, and the luminance jump can be effectively avoided.

In some embodiments, the preset third compensation voltage Vcomp3 is:

$$Vcomp3 = \delta 1 \times Vchange \times (B - A)/M1$$

where δ1 is a preset compensation coefficient, and Vchange is an increase value of a maximum voltage drop of the power trace for each additional pixel unit group for displaying in the display apparatus. It should be noted that a value of Vchange may be measured according to a preliminary experiment, and δ1 may be set according to actual requirements for the compensation.

Figure 29:
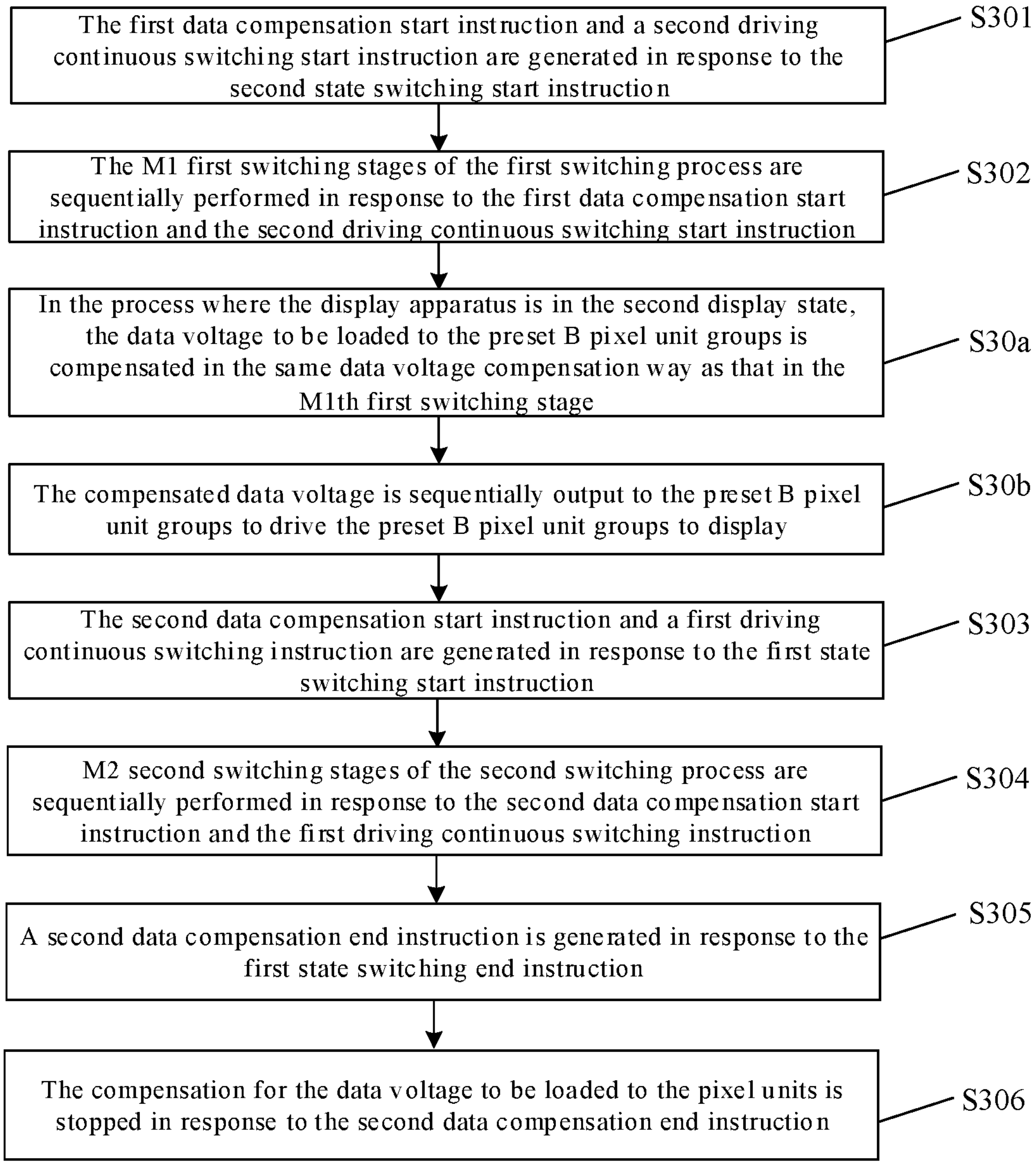
FIG. 29 is another flowchart of a data driving method according to an embodiment of the present disclosure.
Figure 30:
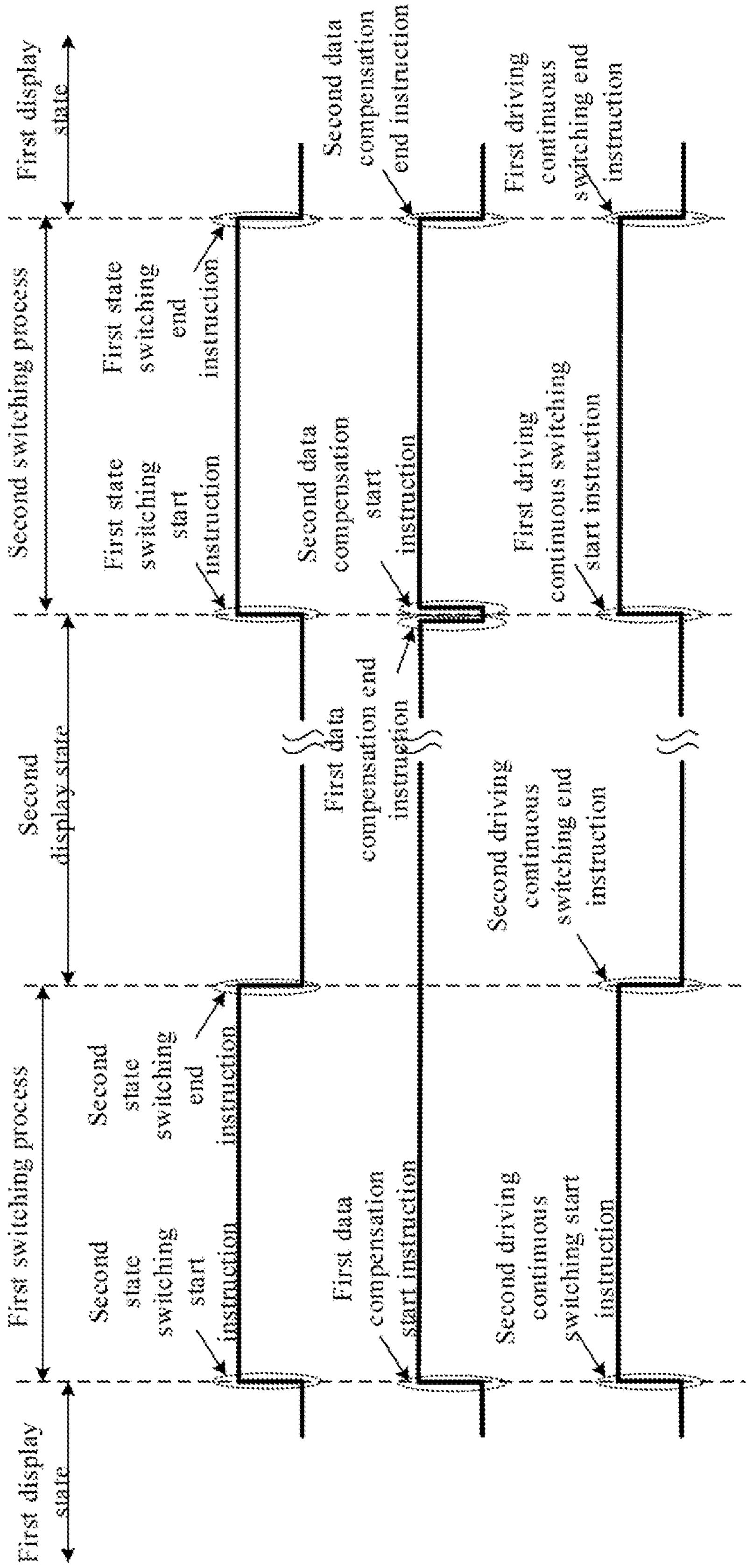
FIG. 30 is a timing diagram corresponding to the data driving method shown in FIG. 29.

FIG. 29 is another flowchart of a data driving method according to an embodiment of the present disclosure; FIG. 30 is a timing diagram corresponding to the data driving method shown in FIG. 29. As shown in FIG. 29 and FIG. 30, the data driving method shown in FIG. 29 includes step S301 and step S302 in the data driving method shown in FIG. 27, and also includes step S303 and step S304, which are described in detail below.

Step S303, the second data compensation start instruction and a first driving continuous switching instruction are generated in response to the first state switching start instruction.

Step S304, M2 second switching stages of the second switching process are sequentially performed in response to the second data compensation start instruction and the first driving continuous switching instruction.

The second switching process includes the M2 second switching stages occurring in sequence; in an m2-th second switching stage, the ith pixel unit group to the (i+B−1−(B−A)×m2/M2)th pixel unit group close to the input side of the power supply are displaying, wherein m2 is a positive integer, m2≤M2, and a value of (B−A)/M2 is an integer.

In step S304, the m2-th second switching stage includes: step S3041 and step S3042.

Step S3041, the data voltage to be loaded to pixel units in the ith pixel unit group to the (i+B−1−(B−A)×m2/M2)th pixel unit group close to the input side of the power supply is compensated, to obtain a compensated data voltage Vdata'.

Step S3042, the compensated data voltage is sequentially output to the ith pixel unit group to the (i+B−1−(B−A)×m2/M2)th pixel unit group close to the input side of the power supply, to drive the ith pixel unit group to the (i+B−1−(B−A)×m2/M2)th pixel unit group close to the input side of the power supply to display.

Like the compensation process in the first switching process, in the second switching process, the number of pixel unit groups for displaying is gradually switched from B to A by switching the number of pixel unit groups for displaying several times.

As an application scenario, in the first switching process, the number of pixel unit groups for displaying is switched synchronously with the switching of the physical state of the display apparatus. For specific contents, reference may be made to the above description for step S3021 and step S3022.

In some embodiments, step S3041 specifically includes: compensating the data voltage to be loaded to pixel units in the ith pixel unit group to the (i+B−1−(B−A)×m2/M2)th pixel unit group close to the input side of the power supply according to a preset fourth compensation voltage, to obtain a compensated data voltage Vdata':

$$Vdata' = Vdata - (M2 - m2) \times Vcomp4$$

Vdata is a data voltage before the compensation, and Vcomp4 is the preset fourth compensation voltage; wherein when A<B, Vcomp4>0; when A>B, Vcomp4<0. As can be seen from the above equation, a portion for compensating the data voltage is (M2−m2)×Vcomp4, which varies linearly with the variation of m1.

In some embodiments, the preset fourth compensation voltage Vcomp4 is:

$$Vcomp4 = \delta 2 \times Vchange \times (B - A)/M1$$

where δ2 is a preset compensation coefficient, and Vchange is an increase value of a maximum voltage drop of the power trace for each additional pixel unit group for displaying in the display apparatus. It should be noted that a value of Vchange may be measured according to a preliminary experiment, and δ2 may be set according to actual requirements for the compensation.

In some embodiments, after step S304, the method further includes: step S305 and step S306.

Step S305, a second data compensation end instruction is generated in response to the first state switching end instruction.

Step S306, the compensation for the data voltage to be loaded to the pixel units is stopped in response to the second data compensation end instruction.

In some embodiments, between step S302 and step S303, the method further includes: step S30*a* and step S30*b*.

Step S30*a*, in the process where the display apparatus is in the second display state, the data voltage to be loaded to the preset B pixel unit groups is compensated in the same data voltage compensation way as that in the M1-th first switching stage.

Step S30*b*, the compensated data voltage is sequentially output to the preset B pixel unit groups to drive the preset B pixel unit groups to display.

It should be noted that when the second display state ends and the second switching process is entered, the source driver also generates the first data compensation end instruction to stop compensating the data voltage in the compensation way for the data voltage as in the M1-th first switching stage.

Figure 31:
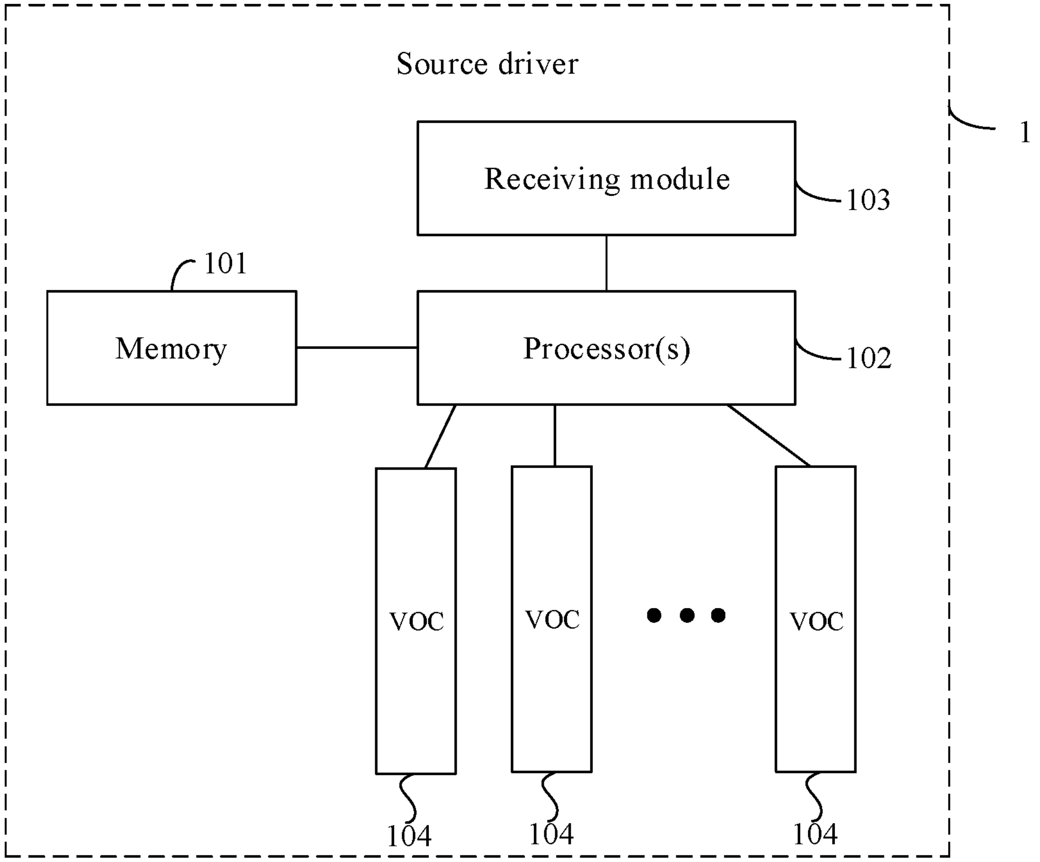
FIG. 31 is a block diagram of a structure of a source driver according to an embodiment of the present disclosure.

Based on the same inventive concept, the embodiment of the present disclosure also provides a source driver. FIG. 31 is a block diagram of a structure of a source driver according to an embodiment of the present disclosure. As shown in FIG. 31, the source driver includes: one or more processors 102 and a memory 101 having one or more programs stored thereon; the one or more programs, when executed by the one or more processors 102, cause the one or more processors 102 to implement the data driving method as provided by the above embodiments.

In some embodiments, the source driver further includes a receiving module 103 and a plurality of voltage output channels (VOCs) 104, wherein the plurality of voltage output channels 104 are in one-to-one correspondence with the data lines, and each of the plurality of voltage output channels 104 is electrically connected to a corresponding data line.

The receiving module is configured to receive display data (for example, gray scale data) of each pixel unit in a picture to be displayed from the outside, and obtain a corresponding data voltage through a calculation according to the received display data.

As an alternative, the data voltage Vdata is:

$$Vdata = V\min + \frac{V\max - V\min}{L\max} * Lg$$

where Vmin is a preset minimum data voltage, Vmax is a preset maximum data voltage, Lmax is a preset maximum gray scale value, and Lg is the gray scale data.

The receiving module 103 transmits the data voltage obtained through a calculation to the processor to perform a corresponding processing by the processor.

After executing the program in the memory 101 to implement the data driving method provided in the above embodiment, the processor 102 needs to transmit the data voltage to a data line through a corresponding voltage output channel 104, thus, to a corresponding pixel unit. Each voltage output channel 104 has a digital-to-analog conversion function and a buffer function. Specifically, each voltage output channel 104 generally includes a digital-to-analog conversion circuit and an output buffer circuit, wherein the digital-to-analog conversion circuit may perform a digital-to-analog conversion processing on the data voltage transmitted by the processor 102, and then the data voltage is transmitted to a corresponding data line through the output buffer circuit, and the output buffer circuit generally adopts a unity gain operational amplifier structure (with a better unity gain) for improving a driving capability of the data voltage.

It will be understood by one of ordinary skill in the art that all or some of the steps in the data driving method, the system, functional modules in the systems provided by the present disclosure may be implemented as software, firmware, hardware, or suitable combinations thereof. In a hardware implementation, a division between functional modules referred to in the above description does not necessarily correspond to a division of physical components. For example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on computer readable media, which may include computer storage media (or non-transitory media) and communication media (or transitory media). The term computer storage media includes volatile and nonvolatile, removable and non-removable media implemented in any method or technology for storage of information such as computer readable instructions, data structures, program modules or other data, as is well known to one of ordinary skill in the art. The computer storage media include, but are not limited to, RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices, or any other medium which may be used to store the desired information and which may be accessed by a computer.

Based on the same inventive concept, the embodiment of the present disclosure also provides a display apparatus, including a display panel and the source driver as provided in the above embodiments.

In some embodiments, the display panel is a flexible display panel. Further, optionally, the flexible display panel is a foldable screen, a rollable screen, or a scrollable screen.

The display apparatus provided by the embodiment may be: any product or component with a display function, such as a flexible wearable device, a mobile phone, a tablet computer, a television, a display, a notebook computer, a digital photo frame, a navigator or the like. Other essential components of the display apparatus are understood by one of ordinary skill in the art to be included, and are not described herein or should not be construed as limiting the present disclosure.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A data driving method for a source driver in a display apparatus, wherein the data driving method comprises:

configuring the display apparatus to have a first display state and a second display state wherein A pixel unit groups are preset for displaying in the first display state, B pixel unit groups are preset for displaying in the second display state, A and B are positive integers, and A≠B; and in a first switching process of switching the display apparatus from the first display state to the second display state, compensating a data voltage to be loaded to pixel units in response to a first data compensation start instruction, to compensate a change in a voltage drop on a power trace between two different display states of the first display state and the second display state, wherein the display apparatus further comprises a display panel which comprises: the power trace, a plurality of pixel unit groups and a plurality of data lines; the power trace extends away from an input side of a power supply along a first direction; the plurality of pixel unit groups are sequentially arranged away from the input side of the power supply along the first direction; each pixel unit group comprises a plurality of pixel units arranged along a second direction; each pixel unit is connected to a corresponding data line and the power trace; the source driver is connected to each data line to write a corresponding data voltage into the data line;

wherein the plurality of pixel unit groups comprises N pixel unit groups;

the preset A pixel unit groups are an ith pixel unit group to an (i+A−1) th pixel unit group close to the input side of the power supply;

the preset B pixel unit groups are the ith pixel unit group to an (i+B−1) th pixel unit group close to the input side of the power supply; and i is a positive integer, i+A−1≤N, and i+B−1≤N; and wherein before the compensating a data voltage to be loaded to the pixel units in response to a first data compensation start instruction, the data driving method further comprises:

generating the first data compensation start instruction and a second driving switching instruction in response to a second state switching start instruction; or generating the first data compensation start instruction and a second driving switching instruction in response to a second state switching start instruction and after a preset first time period; or generating the first data compensation start instruction and a second driving switching instruction in response to a second state switching end instruction; and the data driving method further comprises:

sequentially outputting the compensated data voltage to the preset B pixel unit groups in response to the second driving switching instruction, to drive the preset B pixel unit groups to display.

2. The data driving method according to claim 1, wherein i=1, A<B, B=N; or i=1, A>B, A=N.

3. The data driving method according to claim 1, wherein the compensating a data voltage to be loaded to the pixel units in response to a first data compensation start instruction comprises:

compensating the data voltage to be loaded to pixel units according to a preset first compensation voltage to obtain a compensated data voltage Vdata':

$$Vdata' = Vdata - Vcomp1$$

Vdata is a data voltage before the compensation, and Vcomp1 is the preset first compensation voltage; and wherein when A<B, Vcomp1>0; when A>B, Vcomp1<0;

wherein the preset first compensation voltage is related to a maximum voltage drop on the power trace in the first display state and a maximum voltage drop on the power trace in the second display state; and wherein the preset first compensation voltage Vcomp1 is:

$$Vcomp1 = \alpha 1 \times \Delta Vmax\_B - \beta 1 \times \Delta Vmax\_A$$

ΔVmax_B is the maximum voltage drop on the power trace in the second display state, ΔVmax_A is the maximum voltage drop on the power trace in the first display state, and α1 and β1 are preset constants, respectively.

4. The data driving method according to claim 1, wherein after the sequentially outputting the compensated data voltage to the preset B pixel unit groups in response to the second driving switching instruction, the data driving method further comprises:

in a second switching process of switching the display apparatus from the second display state to the first display state, stopping compensating the data voltage to be loaded to the pixel units in response to a first data compensation end instruction.

5. The data driving method according to claim 4, wherein before the stopping compensating the data voltage to be loaded to the pixel units in response to a first data compensation end instruction, the data driving method further comprises:

generating the first data compensation end instruction and a first driving switching instruction in response to a first state switching start instruction; or generating the first data compensation end instruction and a first driving switching instruction in response to a first state switching start instruction and after a preset second time period; or generating the first data compensation end instruction and a first driving switching instruction in response to a first state switching end instruction; and the data driving method further comprises:

in response to the first driving switching instruction, sequentially outputting a corresponding data voltage to the preset A pixel unit groups to drive the preset A pixel unit groups to display.

6. The data driving method according to claim 1, wherein before the compensating the data voltage to be loaded to the pixel units in response to the first data compensation start instruction, the data driving method further comprises:

generating the first data compensation start instruction in response to a second state switching start instruction;

after the step of compensating the data voltage to be loaded to the pixel units in response to the first data compensation start instruction, the data driving method further comprises:

sequentially outputting the compensated data voltage to the preset A pixel unit groups to drive the preset A pixel unit groups to display;

generating a first data compensation end instruction and a second driving switching instruction in response to a second state switching end instruction;

stopping compensating the data voltage to be loaded to the pixel units in response to the first data compensation end instruction; and in response to the second driving switching instruction, sequentially outputting the corresponding data voltage to the preset B pixel unit groups to drive the preset B pixel unit groups to display.

7. The data driving method according to claim 6, wherein the step of compensating the data voltage to be loaded to the pixel units in response to the first data compensation start instruction comprises:

compensating the data voltage to be loaded to pixel units according to a preset first compensation voltage and a first compensation coefficient, to obtain a compensated data voltage Vdata':

$$Vdata' = Vdata + Vcomp1 \times P1(t1)$$

Vdata is a data voltage before the compensation, and Vcomp1 is the preset first compensation voltage; P1(t1) is the first compensation coefficient with a value in positive correlation with an elapsed time period t1 of the first switching process, 0<P1(t1)≤1, 0<t1≤T1; and T1 is a total time period of the first switching process; and wherein when A<B, Vcomp1>0; when A>B, Vcomp1<0;

wherein the preset first compensation voltage is related to a maximum voltage drop on the power trace in the first display state and a maximum voltage drop on the power trace in the second display state; and wherein the preset first compensation voltage Vcomp1 is:

$$Vcomp1 = \alpha 1 \times \Delta \mathrm{Vmax\_B} - \beta 1 \times \Delta \mathrm{Vmax\_A}$$

where ΔVmax_B is the maximum voltage drop on the power trace in the second display state, ΔVmax_A is the maximum voltage drop on the power trace in the first display state, and α1 and β1 are preset constants, respectively; and wherein the first compensation coefficient P1(t1) is:

$$P1(t1) = (t1/T1)^{\gamma}$$

where γ is a gamma value configured for the display apparatus.

8. The data driving method according to claim 6, wherein after the sequentially outputting the corresponding data voltage to the preset B pixel unit groups in response to the second driving switching instruction, the data driving method further comprises:

in a second switching process of switching the display apparatus from the second display state to the first display state, compensating the data voltage to be loaded to the pixel units in response to a second data compensation start instruction, to compensate the change in the voltage drop on the power trace between two different states of the first display state and the second display state.

9. The data driving method according to claim 8, wherein before the compensating the data voltage to be loaded to the pixel units in response to the second data compensation start instruction, the data driving method further comprises:

generating the second data compensation start instruction in response to a first state switching start instruction; and after the compensating the data voltage to be loaded to the pixel units in response to the second data compensation start instruction, the data driving method further comprises:

sequentially outputting the compensated data voltage to the preset B pixel unit groups to drive the preset B pixel unit groups to display;

generating a second data compensation end instruction and a first driving switching instruction in response to a first state switching end instruction;

stopping compensating the data voltage to be loaded to the pixel units in response to the second data compensation end instruction; and sequentially outputting a corresponding data voltage to the preset A pixel unit groups in response to the first driving switching instruction, to drive the preset A pixel unit groups to display.

10. The data driving method according to claim 9, wherein the compensating the data voltage to be loaded to the pixel units in response to the second data compensation start instruction comprises:

compensating the data voltage to be loaded to pixel units according to a preset second compensation voltage and a second compensation coefficient, to obtain a compensated data voltage Vdata':

$$Vdata' = Vdata + Vcomp2 \times P2(t2)$$

where Vdata is a data voltage before compensation, and Vcomp2 is the preset first compensation voltage; P2(t2) is the second compensation coefficient with a value in positive correlation with an elapsed time period t2 of the second switching process, $0<P2(t2)\leq 1$, $0<t2\leq T2$; and T2 is a total time period of the second switching process; and wherein when A<B, Vcomp2<0; when A>B, Vcomp2>0;

wherein the preset second compensation voltage is related to a maximum voltage drop on the power trace in the first display state and a maximum voltage drop on the power trace in the second display state:

wherein the preset second compensation voltage Vcomp2 is:

$$Vcomp2 = \alpha 2 \times \Delta\text{Vmax\_A} - \beta 2 \times \Delta\text{Vmax\_B}$$

where ΔVmax_A is the maximum voltage drop on the power trace in the first display state, ΔVmax_B is the maximum voltage drop on the power trace in the second display state, and α2 and β2 are preset constants, respectively; and wherein the second compensation coefficient P2(t2) is:

$$P2(t2)=(t2/T2)^{\gamma}$$

where γ is a gamma value configured for the display apparatus.

11. The data driving method according to claim 1, wherein the first switching process comprises M1 first switching stages occurring in sequence; and in an m1-th first switching stage, an ith pixel unit group to an (i+A−1+(B−A)×m1/M1)th pixel unit group close to the input side of the power supply are displaying, m1 is a positive integer, m1≤M1, and a value of (B−A)/M1 is an integer;

before the compensating the data voltage to be loaded to the pixel units in response to the first data compensation start instruction, the method further comprises:

generating the first data compensation start instruction and a second driving continuous switching start instruction in response to a second state switching start instruction; and the compensating the data voltage to be loaded to the pixel units in response to the first data compensation start instruction comprises:

sequentially performing the M1 first switching stages in response to the first data compensation start instruction and the second driving continuous switching start instruction; wherein an m1-th first switching stage comprises:

compensating a data voltage to be loaded to pixel units in the ith pixel unit group to the (i+A−1+(B−A)×m1/M1) th pixel unit group close to the input side of the power supply, to obtain a compensated data voltage Vdata'; and sequentially outputting the compensated data voltage to the ith pixel unit group to the (i+A−1+(B−A)×m1/M1) th pixel unit group close to the input side of the power supply, to drive the ith pixel unit group to the (i+A−1+(B−A)×m1/M1)th pixel unit group close to the input side of the power supply to display, wherein the compensating a data voltage to be loaded to pixel units in the ith pixel unit group to the (i+A−1+(B−A)×m1/M1)th pixel unit group close to the input side of the power supply comprises:

compensating the data voltage to be loaded to pixel units in the ith pixel unit group to the (1+A−1+(B−A)×m1/M1)th pixel unit group close to the input side of the power supply according to a preset third compensation voltage, to obtain a compensated data voltage Vdata':

$$Vdata' = Vdata - m1 \times Vcomp3$$

where Vdata is a data voltage before compensation, and Vcomp3 is the preset third compensation voltage; and wherein when A<B, Vcomp3>0, when A>B, Vcomp3<0; and wherein the preset third compensation voltage Vcomp3 is:

$$Vcomp3 = \delta 1 \times Vchange \times (B - A)/M1$$

where δ1 is a preset compensation coefficient, and Vchange is an increase in the maximum voltage drop of the power trace each time when an additional pixel unit group is added in the display apparatus for displaying.

12. The data driving method according to claim 11, wherein after the sequentially performing M1 first switching stages in response to the first data compensation start instruction and the second driving continuous switching start instruction, the data driving method further comprises:

in a second switching process of switching the display apparatus from the second display state to the first display state, in response to a second data compensation start instruction, compensating the data voltage to be loaded to the pixel units, to compensate the change in the voltage drop on the power trace between two different display states of the first display state and the second display state.

13. The data driving method according to claim 12, wherein the second switching process comprises M2 second switching stages occurring in sequence;

in an m2-th second switching stage, an ith pixel unit group to an (i+B−1−(B−A)×m2/M2)th pixel unit group close to the input side of the power supply are displaying, wherein m2 is a positive integer, m2≤M2, and a value of (B−A)/M2 is an integer;

before the compensating the data voltage to be loaded to the pixel units in response to a second data compensation start instruction, the data driving method further comprises:

generating the second data compensation start instruction and a first driving continuous switching instruction in response to the first state switching start instruction; and the compensating the data voltage to be loaded to the pixel units in response to a second data compensation start instruction comprises:

sequentially performing M2 second switching stages in response to the second data compensation start instruction and the first driving continuous switching instruction; wherein an m2-th second switching stage comprises:

compensating the data voltage to be loaded to pixel units in the ith pixel unit group to the (i+B−1−(B−A)×m2/M2)th pixel unit group close to the input side of the power supply, to obtain a compensated data voltage Vdata'; and sequentially outputting the compensated data voltage to the ith pixel unit group to the (i+B−1−(B−A)×m2/M2)th pixel unit group close to the input side of the power supply, to drive the ith pixel unit group to the (i+B−1−(B−A)×m2/M2)th pixel unit group close to the input side of the power supply to display;

wherein the compensating the data voltage to be loaded to pixel units in the ith pixel unit group to the (i+B−1−(B−A)×m2/M2)th pixel unit group close to the input side of the power supply comprises:

compensating the data voltage to be loaded to pixel units in the ith pixel unit group to the (i+B−1−(B−A)×m2/M2)th pixel unit group close to the input side of the power supply according to a preset fourth compensation voltage, to obtain a compensated data voltage Vdata:

$$Vdata' = Vdata - (M2 - m2) \times Vcomp4$$

where Vdata is a data voltage before compensation, and Vcomp4 is the preset fourth compensation voltage; and wherein when A<B, Vcomp4>0; when A>B, Vcomp4<0.

14. The data driving method according to claim 13, wherein the preset fourth compensation voltage Vcomp4 is:

$$Vcomp4 = \delta 2 \times Vchange \times (B - A)/M1$$

where δ2 is a preset compensation coefficient, and Vchange is an increase in the maximum voltage drop of the power trace each time when an additional pixel unit group is added the display apparatus for displaying.

15. The data driving method according to claim 13, wherein after the compensating the data voltage to be loaded to the pixel units in response to the second data compensation start instruction, the data driving method further comprises:

generating a second data compensation end instruction in response to a first state switching end instruction; and stopping compensating the data voltage to be loaded to the pixel units in response to the second data compensation end instruction.

16. The data driving method according to claim 12, wherein between the first switching process and the second switching process, the data driving method further comprises:

when the display apparatus is in the second display state, compensating the data voltage to be loaded to the preset B pixel unit groups the same as for the M1-th first switching stage; and sequentially outputting the compensated data voltage to the preset B pixel unit groups to drive the preset B pixel unit groups to display.

17. A source driver, comprising:

one or more processors; and a memory having one or more programs stored thereon;

wherein the one or more programs, when executed by the one or more processors, cause the one or more processors to implement the data driving method according to claim 1.

18. A display apparatus, comprising: a display panel and the source driver according to claim 17; and the display panel is a foldable screen, a rollable screen, or a scrollable screen.

* * * * *